United States Patent [19]

Kojima et al.

[11] Patent Number: 5,032,198

[45] Date of Patent: Jul. 16, 1991

[54] METHOD FOR MANUFACTURING AN ASSEMBLY OF A BELT, A BAND, AND A TREAD RUBBER

[75] Inventors: Yoshihide Kojima, Takarazuka; Hiroaki Sakuno, Kobe; Masao Takami, Kobe; Katsunori Kadowaki, Kobe; Yoshinobu Miyanaga, Akashi, all of Japan

[73] Assignee: Sumitomo Rubber Industries, Ltd., Hyogo, Japan

[21] Appl. No.: 315,786

[22] PCT Filed: Jun. 17, 1988

[86] PCT No.: PCT/JP88/00609

§ 371 Date: Apr. 14, 1989

§ 102(e) Date: Apr. 14, 1989

[87] PCT Pub. No.: WO88/10199

PCT Pub. Date: Dec. 29, 1988

[30] Foreign Application Priority Data

| Jun. 18, 1987 | [JP] | Japan | 62-151987 |
| Jul. 3, 1987 | [JP] | Japan | 62-167435 |
| Jul. 31, 1987 | [JP] | Japan | 62-193523 |
| Sep. 29, 1987 | [JP] | Japan | 62-244775 |
| Mar. 31, 1988 | [JP] | Japan | 63-80495 |
| Apr. 6, 1988 | [JP] | Japan | 63-85671 |

[51] Int. Cl.$^5$ .............................................. B29D 30/44
[52] U.S. Cl. ............................ 156/117; 152/531; 152/533; 156/123; 156/130; 156/416
[58] Field of Search .............. 156/117, 397, 416, 414, 156/421.4, 123, 130; 152/531, 533, 534, 536, 538

[56] References Cited

U.S. PATENT DOCUMENTS

| 2,814,330 | 11/1957 | Vanzo et al. | 156/416 X |
| 3,485,692 | 12/1969 | Frazier | 156/416 X |
| 3,523,854 | 8/1970 | Cantarutti | 156/397 |
| 4,324,607 | 4/1982 | Dugger | 156/425 X |
| 4,353,772 | 10/1982 | Groeber | 156/425 X |
| 4,420,025 | 12/1983 | Ghilardi et al. | |
| 4,528,052 | 7/1985 | Yoshie et al. | 156/117 |
| 4,724,881 | 2/1988 | Poque et al. | |
| 4,824,501 | 4/1989 | Ushikubo et al. | 156/130 |
| 4,909,878 | 3/1990 | Watanabe | 156/162 |

FOREIGN PATENT DOCUMENTS

| 203889 | 6/1959 | Austria | 152/531 |
| 0235579 | 9/1987 | European Pat. Off. | |
| 1586370 | 2/1970 | France | |
| 83178 | 1/1986 | France | |
| 57-61601 | 12/1982 | Japan | |
| 60-67201 | 4/1985 | Japan | |
| 62-80101 | 4/1987 | Japan | |
| 1495803 | 12/1977 | United Kingdom | |

Primary Examiner—Caleb Weston
Assistant Examiner—Geoffrey L. Knable
Attorney, Agent, or Firm—Birch, Stewart, Kolasch & Birch

[57] ABSTRACT

A pneumatic radial tire includes a belt arranged on the radially outer side of a carcass, and a band arranged on the radially outer side of the belt and composed of one or more continuous organic fiber cords wound spirally and approximately parallel to the circumferential direction of the tire. A radial tire manufacturing method includes the steps of laminating a predetermined number of belt plies on a belt drum or belt ring for forming a belt, and winding one to several organic fiber cords continuously and spirally in the circumferential direction of the belt on the outer surface of the formed belt in order to form a band. A band forming device includes a device for drawing out a cord to be wound, a device for traversing a let-off device in the widthwise direction of the belt, and a device for controlling the traverse of the let-off device. A method of forming belt-band-tread rubber assemblies includes a step of expanding the diameter of the belt drum so that the shape in axial section of belt drum becomes approximately the same as the finished shape of the band in the vulcanization mold. An assembly forming device includes a diameter-variable belt drum, wherein the shape in the axial section of the circumferential surface of the annular body in the diameter-expanded state is the same as or similar to the finished shaped of the band in a mold.

8 Claims, 22 Drawing Sheets

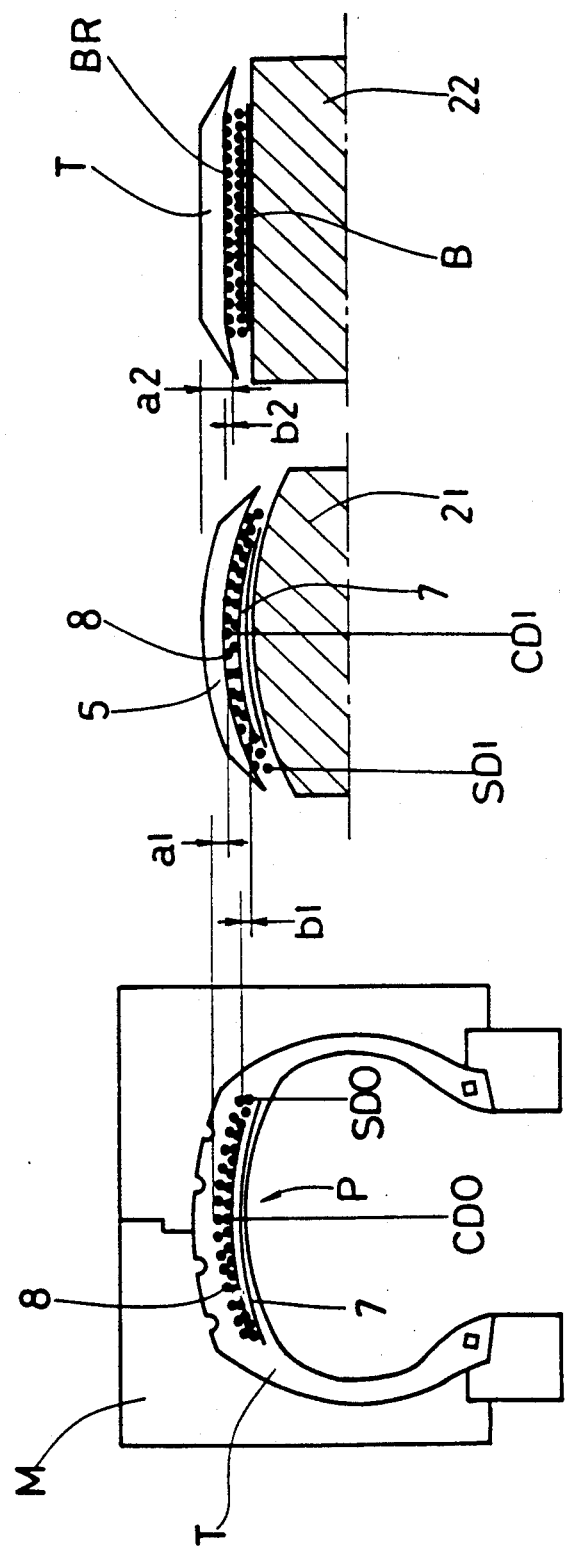

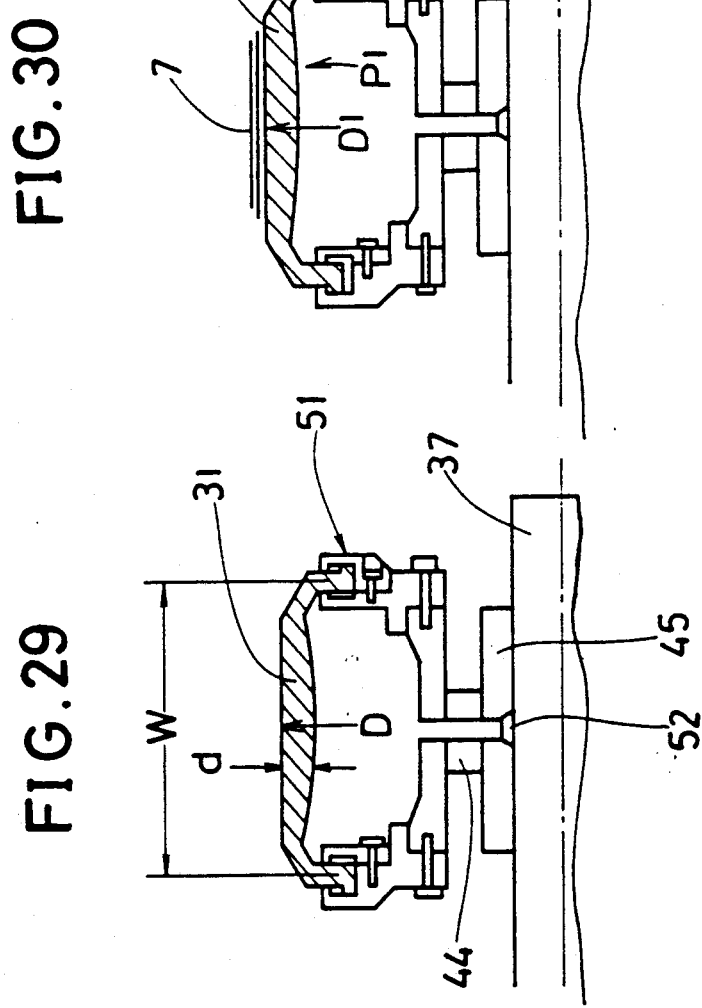

METHOD FOR MANUFACTURING AN ASSEMBLY OF A BELT, A BAND, AND A TREAD RUBBER

TECHNICAL FIELD

This invention relates to a pneumatic radial tire equipped with a band for reinforcing a belt and a method for manufacturing the same, and further relates to an apparatus for forming the band, and a method of and apparatus for forming a belt-band-tread rubber assembly.

BACKGROUND ART

Pneumatic radial tires having a belt in which metallic cords are arranged and which is disposed in the tread portion have been conventionally attached to high performance passenger cars, and high-speed durability, high-speed driving stability and steerability have been accomplished owing to a strong hooping effect of the belt. The conventional speed range from 100 to 200 km/h, however, has been accelerated these days, and some passenger cars to be driven at 200 km/h or more, and sometimes at 300 km/h, have been introduced. In the field of racing cars, machines which are driven at such a speed range already exist, but the driving is only under limited conditions, so that the tires mounted on them have been manufactured by sacrificing general performance requirements in ordinary driving, for example, wearing resistance and fuel economy. Hence, these tires are unable to withstand general use.

If conventional radial tires having a metallic cord belt are used in the high-speed driving as mentioned above, their tread portions are deformed by centrifugal force and repeated distortions are generated in the tread portion. This deformation appears as various phenomena depending on the size, structure and materials of the tire, for example, as a lifting phenomenon in which the outer diameter at the shoulder portion increases, a phenomenon in which the outer diameter at the center portion increases and the radius of curvature of the tread decreases or the surface becomes an irregular curve, or a standing wave phenomenon.

Furthermore, owing to the heat generated by the repeated distortion in the tread caused by such a deformation, the temperature at the tread portion rapidly rises and the adhesion between the metallic cord surface and the rubber in the belt is broken; that is, so-called ply separation occurs. In particular, the tires used in such a high-speed driving as described above require a broad ground contact area to secure the grip on the road surface and, therefore, a flattened tire having a wide tread is employed. In such a low-profile flattened tire having a wide tread, since the occupied rate of the tread portion in the entire tire is large, the above-mentioned phenomena of deformation and heat generation tend to occur.

Use of a rubber with a small loss tangent (tan δ) is effective for decrease of the heat generation, but when such a rubber with a small loss tangent (tan δ) is employed, the grip lowers and required high motional performances are hard to obtain.

Also, decrease of the deformation at the tread portion without changing the formulation of the tread rubber can be achieved by raising the hooping effect of the belt, but if the number of plies of the belt composed of metallic cords is increased, the weight of the tire increases, thus exerting adverse effects on the high-speed property of the entire car.

To solve these problems, a band formed by arranging a multiplicity of independent cords parallel with each other in the circumferential direction of the tire, adhering with rubber, and shaping into a sheet is disclosed in Japanese Patent Publication Kokai No. 47-14805, and Japanese Patent Publication Kokoku No. 55-45402. This band, however, has at least one joint portion extending in the widthwise direction. The stiffness in the circumferential direction decreases at this joint portion, thus large distortion tends to occur to induce breakage. In addition, the joint portion may impair the uniformity of the tire. Accordingly, the band is not sufficient for use in the high speed range described above. The tire having such a band makes no trouble in ordinary speed range but in a high speed range as fast as more than 200 km/h or more than 300 km/h, it is impossible to prevent deformations caused by the centrifugal force on the tread portion and no sufficient durability is obtained.

It is hence a primary object of this invention to provide a tire having a structure capable of withstanding use in such a high speed range without sacrificing other general performances.

As a means of solving the above problems, a jointless band which is formed by winding one or a plurality of organic fiber cords spirally on the belt parallel to the central circumferential line of the tire, and a joint band in which the densities of a spirally wound cord are different between the crown portion and the shoulder portion of the tire so as to enhance the tire performances, are disclosed in Japanese Patent Publication Kokoku No. 44-17801 and Japanese Patent Publication Kokoku No. 57-61601.

But this means has the problem that it takes much time to wind the cord, thus its productivity is inferior, and since the wound cord becomes asymmetrical at the section of the tire, the uniformity such as conicity is poor.

Furthermore, upon changing the cord density, if the density is set too high, the cord surfaces contact each other, which sometimes induces breakage at that point.

It is hence another object of this invention to provide a radial tire having a superior uniformity of the tire and excellent productivity in which the breakage at the shoulder portion of the belt due to the lifting in driving is surely prevented and the contact between cord surfaces is inhibited, and its manufacturing method.

It is still another object of this invention to provide an assembly of belt, band and tread rubber which can improve the high-speed durability of the radial tire as mentioned above, and a method of and apparatus for forming the band.

Generally, in the manufacturing process of radial tires, an integrally assembled body is previously formed by winding these belt, band and tread rubber sequentially on a belt drum.

As shown in FIGS. 39, 40 and 42, conventional belt drum 300 is supported rotatably at one side on a shaft 301 and has a belt-forming surface S1 of which shape in the circumferential direction is annular and of which sectional shape in the axial direction is linear. The belt-forming surface S1 is formed by plural slats 303 each having a width of approximately 40 mm arranged radially on its entire circumference, and both ends of the slat are fastened with a pair of annular springs 302. An air bag 304 equipped with an air pipe 306 is fixed inside the slats in the radial direction by a supporting base 305.

Drum outer diameter defining rings 308 are detatchably mounted on frames 307 disposed on both sides of the slats.

A conventional method of manufacturing an assembly of the belt, band and tread by using the above existing belt drum is explained below:

the drum outer diameter is expanded by inflating the air bag with air supplied through the air pipe; at this time, the outer diameter of the drum is restricted to a specified belt adhering diameter by the drum outer diameter defining ring;

a belt B is formed (see FIG. 40) by winding up a plurality of plies composed of cords which are coated with a rubber and are woven in the form of cord fabric, on the belt-forming surface S1 so that the cords of each ply cross each other at an angle of 10 to 40 degrees with regard to the circumferential direction;

a band BR is formed by further winding one ply or two plies of cords which are coated with a rubber and are woven in the form of cord fabric, on the circumferential surface of the belt B at an angle of nearly 0 degree with respect to the circumferential direction; and a tread rubber T is wound on the radially outer side of the band BR, thus forming an assembly A into one body.

The thus formed assembly is taken out from the belt drum by using a holding means and transferred to the center of a cylindrical carcass of the tire on a tire forming drum. The carcass of tire is sequentially swollen in a toroidal shape by an air pressure so as to have its circumferential surface pressed tightly against the belt inside the assembly. The belt is furthermore pressed and attached to the tire carcass over the full width of the belt by a tread attaching roller, whereby the assembly is combined integrally with the tire carcass to provide a raw tire.

Also, in Japanese Patent Publication Kokai No. 61-51979 there is disclosed a method for forming a band by spirally and continuously winding one or a multiplicity of synthetic fiber cords in the circumferential direction on the circumferential surface of the belt formed on the belt ring, covering in a range of at least 70% of the belt width, with a pitch of 5 to 15 mm in the widthwise direction.

In this method, since the winding pitch of the cord is set as wide as 5 to 15 mm, a disadvantageous expansion of the equatorial diameter of the raw tire due to the shaping internal pressure in vulcanizing process can be effectively prevented, but thermal shrinking force of the band becomes weaker at shoulder portions than at the center portion as shown in FIG. 42. Consequently, one of the band characteristics, that is, a function to prevent the lifting phenomenon of the belt owing to the centrifugal force during running cannot be fully executed. In other words, a reinforcing effect for the failure of the belt due to the lifting while running is insufficient.

Such a problem results from the fact that the band is formed by winding on a cylindrical belt drum having a linear sectional shape in the axial direction as described above and shown in FIGS. 39, 40 and 22, in spite of the belt and band of the finished tire in the mold being convex in its sectional shape in the axial direction (final shape) as shown in FIG. 20.

That is, though the circumferential winding lengths in forming are identical at shoulder portions and the center portion of the belt, the circumferential lengths of the belt after vulcanization of tire become short at belt shoulder portions and long at the belt center portion due to the shaping (expanding) process in vulcanization. As a result, the stretch becomes large at the center portion and small at the shoulder portions of the belt, and the thermal shrinking force is lessened at the shoulder portions. Since a larger stretch is applied on the center portion of the belt, a stretch difference exceeding 2% usually occurs.

The trouble mentioned above is induced because the stretch difference appears as the differences in residual elongation and thermal shrinking force as shown in FIGS. 41 and 42. Here, the term "stretch" means percentage of finishing diameter to the winding diameter of the belt.

Accordingly, another object of this invention is to provide an assembly of belt, band and tread rubber in which the difference of the stretches between the center portion and the shoulder portions of the band is made as small as 2% or less and in order to raise the thermal shrinking force at the shoulder portion, in its turn raise a function to prevent lifting of the belt layer by which a high-speed durability can be improved, and a method of and apparatus for forming the band.

DISCLOSURE OF INVENTION

In one of the aspects, this invention relates to a pneumatic radial tire having a band disposed outside a carcass with respect to the radial direction of the tire, which is characterized in that the band is composed of continuous one to several organic fiber cords spirally wound almost parallel to the circumferential direction of the tire.

In another aspect, this invention relates to a method for producing a radial tire comprising the steps of deforming a cylindrical tire carcass into a toroidal shape and adhering a belt and a tread onto the outer surface of the carcass, which is characterized in that the method includes the step of spirally winding one to several organic fiber cords on the circumferential surface of the formed belt continuously in the circumferential direction of the belt in order to form a band for reinforcing the belt.

In still another aspect, this invention relates to an apparatus for forming a band by continuously and spirally winding one to several organic fiber cords on the circumferential surface of the belt formed on a belt drum or belt ring, which is characterized in having a let-off means for drawing out the cord to be wound to the belt side, a traverse means for causing the let-off means to traverse in the widthwise direction of the belt, and a traverse control means for controlling the traverse of the letting out means.

In another aspect, this invention relates to a method for forming an assembly composed of a belt, a band and a tread rubber by using a belt drum capable of changing its diameter, which is characterized by including a step of expanding the diameter of the belt drum so as to make the axial sectional shape of the band drum identical or close to the finishing shape of the belt in a mold, and a step of forming a band composed of an organic fiber cord on the outside of the belt with respect to the radial direction of the belt on the belt drum expanded to the above-mentioned shape.

In a still another aspect, this invention relates to an apparatus for forming an assembly composed of a belt, a band and a tread rubber suitable for radial tires, which is characterized in that the apparatus is provided with a diameter-variable belt drum comprising an annular forming body of an elastomer capable of expansion and contraction and a diameter changing means for changing the diameter of the annular molded body.

In another aspect, this invention relates to an apparatus for forming an assembly composed of a belt, a band and a tread rubber which comprises a belt drum capable of changing its diameter, and a band forming device for forming the band by continuously and spirally winding one to several organic fiber cords on the circumferential surface of the belt formed on the belt drum.

BRIEF DESCRIPTION OF DRAWINGS

FIGS. 20 to 22 are views for illustrating a method for forming a belt-band-tread rubber assembly of this invention, in which FIG. 20 shows a state of curing of a tire, FIG. 21 shows a state of forming of the assembly and FIG. 22 shows a conventional forming method;

FIGS. 29 to 31 are section views showing another embodiment of the apparatus for forming a belt-band-tread rubber assembly of this invention;

FIGS. 33 to 40 are axial section views showing a conventional belt drum;

BEST MODE FOR CARRYING OUT THE INVENTION

Figure 1:
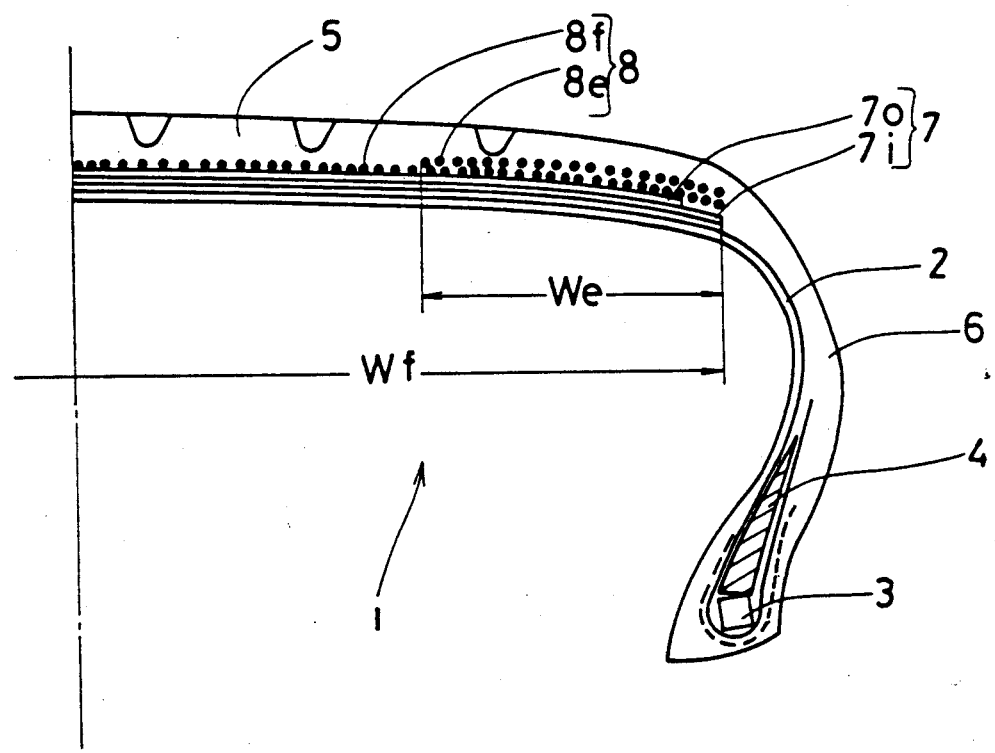
FIG. 1 is a section view showing an embodiment of the pneumatic radial tire of this invention.

Referring now to the drawings, embodiments of the pneumatic radial tire of this invention are explained below.

FIG. 1 is a sectional view showing a first embodiment of the pneumatic radial tire according to the present invention, where a tire 1 comprises a pair of bead cores 3, a pair of bead apexes 4, a carcass 2, an annular tread 5, a pair of side walls 6, a belt 7 and a band 8.

The bead cores 3 are arranged in bead portions of the tire. The bead apexes 4 are made of a hard rubber and disposed outside the bead cores with respect to the radial direction of the tire.

The carcass 2 is composed of cords arranged in the radial direction of the tire, and is turned up around the bead cores and fastened. This embodiment shows a carcass composed of one ply, but the carcass may be composed of a plurality of plies.

The belt 7 is arranged on the radially outer side of the carcass 2, which is composed of two or more plies of metallic cords. In this embodiment, it is composed of an inner ply 7i and an outer ply 7o, but one or two plies may be interposed between them. In the drawing, the inner ply has a larger width than the outer ply but it does not matter if vice versa. If the two plies have the same width, however, the bending stiffness in the section varies drastically at the edges, which makes an adverse effect on the durability, so that it is necessary to set these plies in different widths.

Also, the above metallic cords of the belt are arranged at an angle of 10 to 30 degrees with regard to the equatorial line of the tire.

The band 8 is located on the radially outer side of the belt 7. The band comprises a full band layer 8f and a pair of edge band layers 8e.

The full band layer 8f is disposed over the full width of the belt, that is, over the full width of the inner ply having the maximum width. Each edge band layer 8e is arranged between the full band layer 8f and the belt or between the full band layer 8f and the annular tread 5 in the region near the belt edge.

Figure 2:
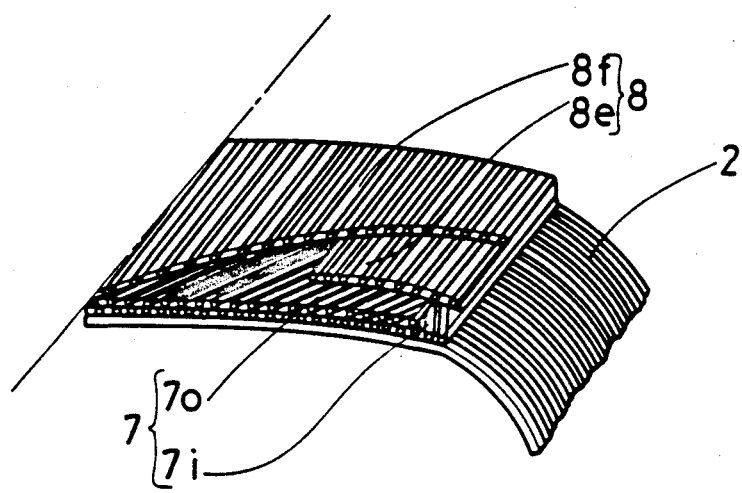
FIG. 2 is a perspective view showing an arrangement of a belt, a band and a tread rubber in another embodiment of the pneumatic radial tire of this invention.

FIG. 2 is a perspective view showing the arrangement of the carcass, belt and band in the case where the disposition of the edge band layers and full band layer is reversed.

It is preferable to match the edges of the full band layer, edge band layers and the inner ply of the belt. When the edges of the full band layer and the edge band layers are located inward from the belt edge, the lifting described above is difficult to be prevented. Even if they are located outside the belt edge position, no specific effect is obtained thereby. Moreover, extra materials are required for the exceeding portion. Also, since organic fiber cords must be wound on the rubber member in an area where no metallic cord is present, it induces a problem in maintaining the uniformity of cord tension and cord position in the manufacturing.

The ratio We/Wf of the width We of the edge band layer 8e measured in the axial direction of the tire to the width Wf of the full band layer 8f measured in the axial direction of the tire is set in a range from 0.2 to 0.3. When the ratio We/Wf is less than 0.2, the durability drops down sharply. On the other hand, even if We/Wf exceeds 0.3, no further improvement of durability is expected. Also, it has been found that a tire in which We/Wf is larger than 0.3, tends to control a car body with difficulty because the stiffness of the entire tread portion becomes stronger. From such reasons, it is necessary that the value We/Wf is within a range of 0.2 to 0.3.

The edge band layers and full band layer are composed of organic fiber cords substantially parallel to the equatorial line of the tire. The organic fiber cord is a single long cord composed of a multiplicity of single yarns or twisted yarns such as spun yarn, monofilament yarn and multifilament yarn of organic fibers made of nylon 66, nylon 6, polyester, Kevlar and the like. This cord C is formed of one to several cords wound spirally in the circumferential direction of the tire in each layer as shown schematically in FIG. 3. Consequently, conventional joint parts no longer exist in each layer and the troubles caused by the existence of the joints can be completely prevented. At the conventional joint portion, both ends in the circumferential direction of each layer are only put to overlap each other, so that this portion cannot endure a large tension in the circumferential direction. It therefore often induces the breakage due to use in high-speed range. The joint portions also spoil the uniformity of the tire.

Figure 4:
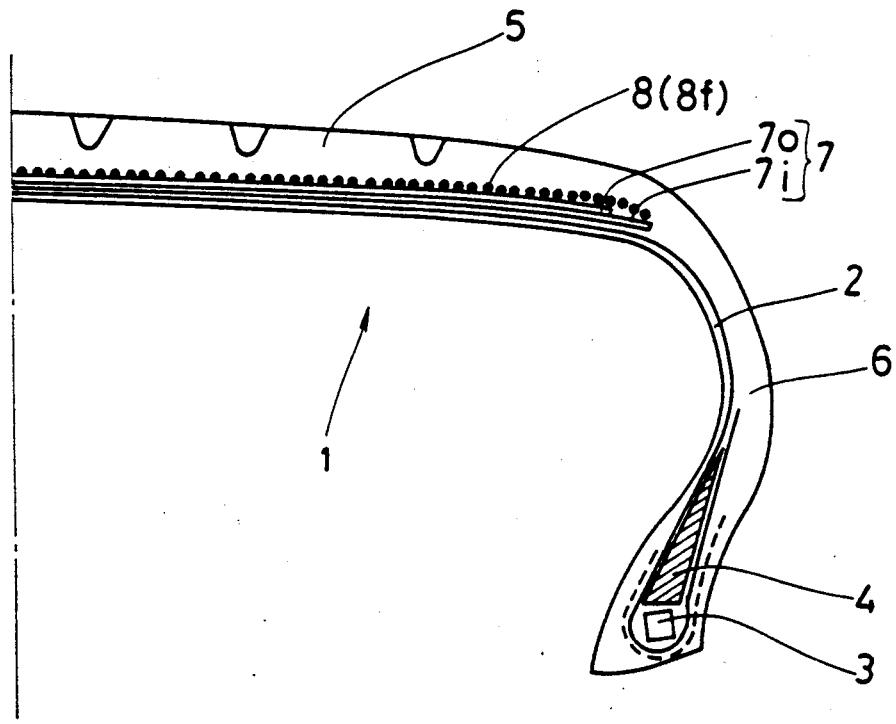
FIG. 4 is a section view showing a still another embodiment of a pneumatic radial tire of this invention.

FIG. 4 is a sectional view showing a second embodiment of the pneumatic radial tire of this invention. In this embodiment, the band 8 has only a full band layer 8f with no edge band layer.

Figure 3:
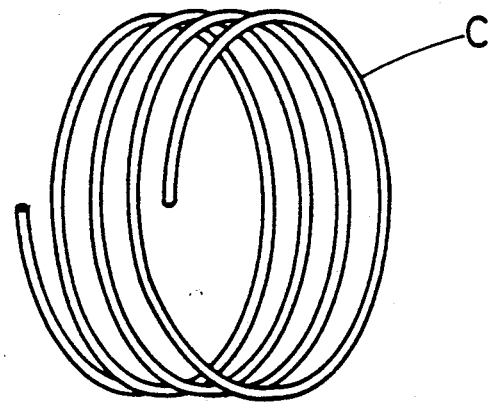
FIG. 3 is a perspective view showing schematically the state of the winding of a cord of the band.

This full band layer 8f is composed, in the same way as in the former embodiment, of one to three organic fiber cords C spirally wound in the circumferential direction as shown in FIG. 3. The elongation at given load of the organic fiber cord has such a distribution as to become smaller from the crown portion to the shoulder portions of the tire. Here, the elongation at given load is measured by a method specified in JIS L1017, and expresses the elongation of the cord under a load determined according to the material and the thickness of the cord.

Figure 5:
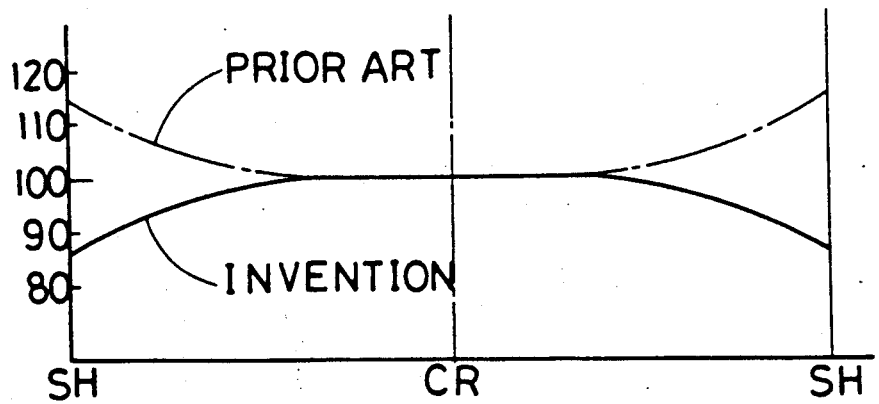
FIG. 5 is a view showing a distribution of elongation of the cord of the band under a prescribed load.

FIG. 5 shows an example of the distribution of the elongation at given load of the organic fiber cord contained in the full band layer. In this graph, the axis of ordinates indicates the elongation at given load of each tire, which is expressed by an index where the value at the crown portion of each tire is regarded as 100. The axis of abscissas indicates the portions of the tire, and the expressions "CR: crown portion", "SH: shoulder portion" show the position where the tire equatorial surface intercrosses with the band layer, and the position of the belt edge, respectively. In the distribution of conventional products, as shown by a dot-and-dash line, the values tend to become larger at the shoulder portions than at the crown portion, so that the binding force of the band at the shoulder portions become lower in comparison with that at the crown portion. In contrast, the distribution of the product of this invention shown by a solid line denotes that the elongation at given load becomes smaller as approaching nearer to the shoulder portions.

This distribution can be obtained by winding organic fiber cords while applying a larger tension as coming nearer to the shoulder portions when winding the cords in the tire forming process.

The tire of this invention can be produced by either (a) a method comprising the steps of winding a belt, at first, on the belt drum and then spirally and continuously winding a rubberized organic fiber cord on the belt to form a band, winding a tread on the band, thus forming an annular assembly composed of the belt, band and tread rubber on the belt drum, positioning this annular assembly at the tire forming drum, and adhering a separately formed carcass to this assembly by shaping it, or (b) a method by winding the belt, band and tread directly on the carcass which has been formed and subjected to shaping.

In winding the organic fiber cord C, it is acceptable to wind several cords, e.g. 2 to 3 cords, while gathering so as to be aligned, or to wind only one cord.

Figure 7:
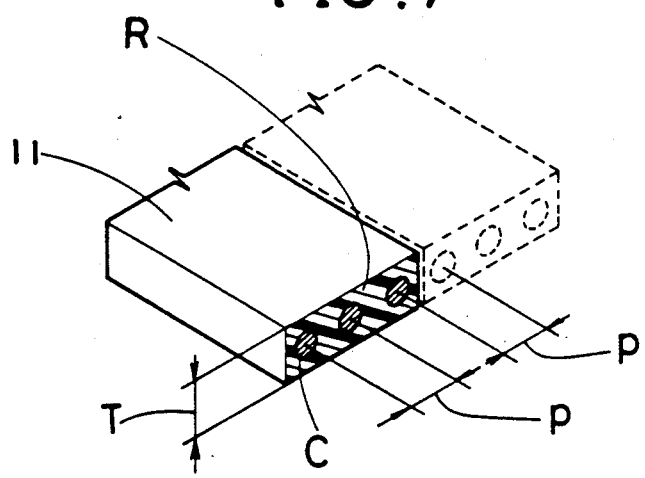
FIG. 7 is a perspective view showing cords formed into a tape shape by incorporating several cords into a body with a rubber.
Figure 9:
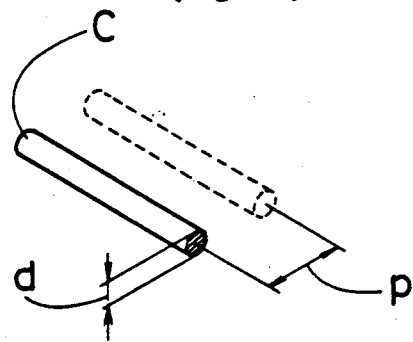
FIG. 9 is a perspective view showing a non-coated cord.

FIG. 7 shows cords in which several cords are aligned and combined into one body by coating rubber R and formed into a tape shape (belt or ribbon-like body). If a plurality of cords are arranged and united in a body as described above, it becomes easy to accurately set a pitch p between the cords. This tape-like body can be easily formed by an extruding machine or a calender ball. In case of making the cords into a ribbon, it is preferable from the viewpoint of uniformity of the tire to set the number of cords to such an extent that the angles of the wound cords to the circumferential direction may not exceed 0 degree so much. Here, the drawing shows a tape-like body 11 composed of three cords, but the number of cords may be selected in a range not exceeding about 5-10.

When embedding several cords in the coating rubber, the amount of the rubber contained in one pitch is expressed by the equation:

$$Tp - \pi d^2/4$$

where T indicates the thickness of the tape-like body.

Figure 8:
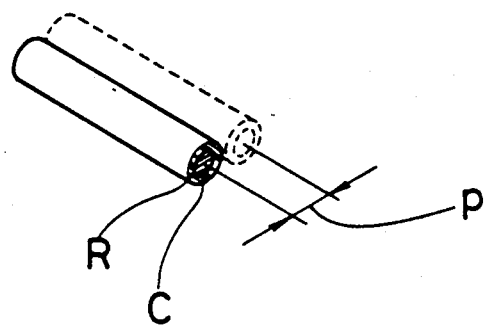
FIG. 8 is a perspective view showing a single cord coated.

In the case of winding single organic fiber cord, preferably the cord is previously covered with a coating rubber R as shown in FIG. 8. The thickness t of this coating rubber should satisfy the relation:

$$0.1 mm \leq t \leq 0.2 mm$$

The diameter d of the organic fiber cord C is set so that the pitch p which is the distance between the centers of the cords becomes:

$$p = d + 2t$$

The diameter d is measured by the method specified in JIS L 1017. The amount of rubber contained in one pitch is $$(p^2 - d^2)/4$$

and when $T=p$, the band is short of rubber in an amount expressed by:

$$(p^2 - \pi d^2/4) - \pi(p^2-d^2)/4 = 3\pi p^2/4$$

The shortage of the rubber induces corrugations on the band surface in the finished tire. If the corrugations are large, an adverse effect is given on the durability.

The present inventors made a test by changing the thickness of the rubber to be applied onto organic fiber cords, and as a result, they have found that a sufficient durability is obtained when the rubber thickness t is 0.1 mm or more. If the rubber thickness t exceeds 0.2 mm, the pitch p becomes so large that the organic fiber cords may be insufficient, thus a sufficient tread stiffness cannot be obtained.

The diameter d of the above cords, meanwhile, is determined by the strength required in preventing the lifting and it is, for example, $$0.5mm \leq d \leq 1.5mm$$

Also, the thickness t of the rubber coating is determined by the necessary durability and it is, for example, $$0.05mm < t < 0.8mm,$$

preferably, $$0.1mm \leq t \leq 0.2mm,$$

as mentioned above.

As the coating rubber R, the same or equivalent rubbers as those used as a coating rubber of conventional bands (nylon band having a joint portion extending in the widthwise direction) can be employed, for example, a rubber compound mainly composed of natural rubber, a blend of natural rubber and SBR, and other rubbers which have a good adhesion to the cords.

When winding the above-mentioned organic fiber cords, a tension is applied to the cords. This winding tension may be uniform in the widthwise direction of the belt, but preferably the cords are wound so that the cord tension after vulcanization of the tire becomes uniform without having any difference in the entire width of the belt, or that the winding tension of the cord becomes maximum at the shoulder portions of the belt and minimum at the center portion so as to make the elongation of the cord at given load small at the shoulder portions of the belt and large at its center portion. By taking such a means, necessary stiffness at the tread portion with a necessary distribution throughout the section of the tire can be obtained without providing any edge band layer or changing the density of cords. Moreover, the high-speed durability of the finished tire can be further enhanced. In this case, the value of winding tension can be arbitrarily selected depending on the size and the structure of the tire, but if it is set so as to be minimum at the crown portion of the tire and to gradually increase toward the shoulder portions to reach maximum at the shoulder portions of the belt, the cord tension of the band in the vulcanized tire becomes more uniform in the entire width of the belt. Besides, if the increment of the winding tension at that time is set at a value necessary for giving an elongation corresponding to the differences of the outer diameters between the crown portion and other positions of the band in finished tire, a uniform stiffness in the circumferential direction can be obtained.

For instance, when using nylon 66 1260 d/2 as the organic fiber cord, the winding tension is set minimum at the crown portion as 20 g, and is gradually increased toward the shoulder portions to reach maximum at the shoulder portions as 40 g. When defined in this way, the cord tension of the band in vulcanized tire becomes uniform in the entire width at 50 g.

Similar effects can be obtained by setting the winding tension constant, and instead of this, by gradually increasing the cord diameter from the crown portion toward the shoulder portions. For example, when using nylon 66 1260 d/2 as an organic fiber cord, it is preferable to set the winding tension constant in a range from 30 g to 50 g.

Also, the organic fiber cord C is preferably wound so that the radius of curvature at the section of the band in forming coincides with the radius of curvature of the band in the finished tire, in order that the difference between the stretch at the center of the band and the stretch at the shoulder portions falls within 2% (this will be explained in more detail in the method for forming an assembly of belt, band and tread rubber of this invention mentioned after. By doing so, the residual elongation or thermal shrinking force of the organic fiber cord of the band in the finished tire becomes uniform between the center portion and the shoulder portions or becomes higher at the shoulder portions, thus the lowering of the hooping effect of the band at the shoulder portions of the belt can be prevented.

Figure 15:
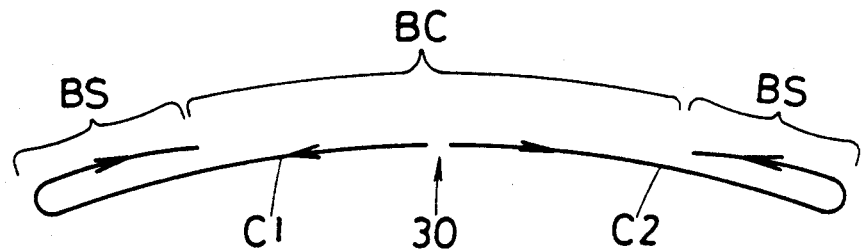

FIGS. 10 to 13 are sectional views showing the winding process of organic fiber cord in a manufacturing process of the tire, respectively. FIGS. 14 and 15 are sketches showing the way of winding, respectively.

Figure 10:
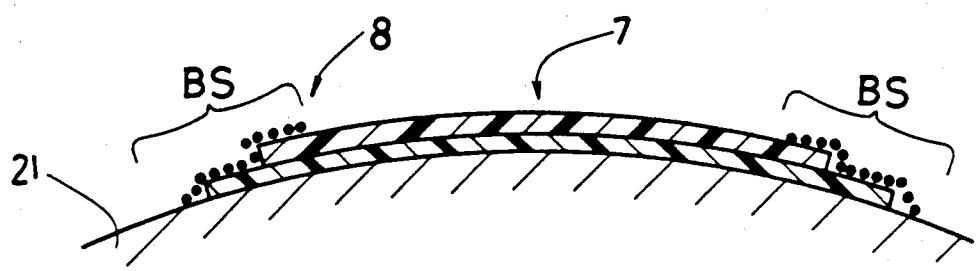
FIGS. 10 to 13 are section views for showing examples of a method for producing radial tires of this invention, respectively.

FIG. 10 shows a state of forming a band comprising only a pair of so-called edge band layers wherein one to several rubber-coated cords C mentioned above are wound only at both shoulder portions BS of the belt 7 on the circumferential surface of the belt 7 of two-ply structure wound on the belt drum or belt ring 21. In this case, it is necessary to set the winding pitch of the cord at 0.5 to 5.0 mm as described above to prevent the lifting of the shoulder portions of the belt. The above-mentioned spiral winding should be made in one turn or more, in compliance with necessity, outward from the equatorial plane of the tire or in the opposite direction so as to have a symmetric structure to each other.

Figure 11:
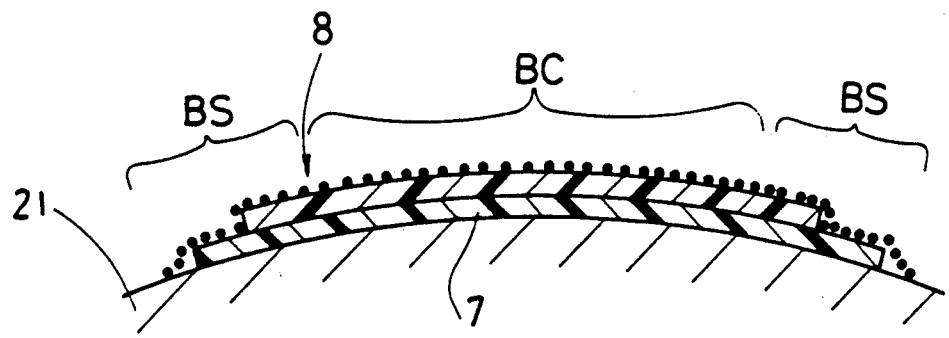

FIG. 11 shows a state of formation of a band comprising only a so-called full band layer by continuously winding the rubber-coated cord C over 70% of the entire width of belt 7 on the outer surface of the belt 7 of two-ply structure wound on the belt drum or belt ring 21. It is necessary that the winding pitch is from 0.5 to 5.0 mm at shoulder portions BS of the belt to prevent the lifting at belt shoulder portions, and also the pitch is from 0.5 to 15.0 mm at the center portion BC of the belt. This spiral winding is also made, in the same way as the above, in one turn or more in compliance with necessity so as to be in a symmetric structure outward from the equatorial plane of the tire or in the reverse direction.

Figure 12:
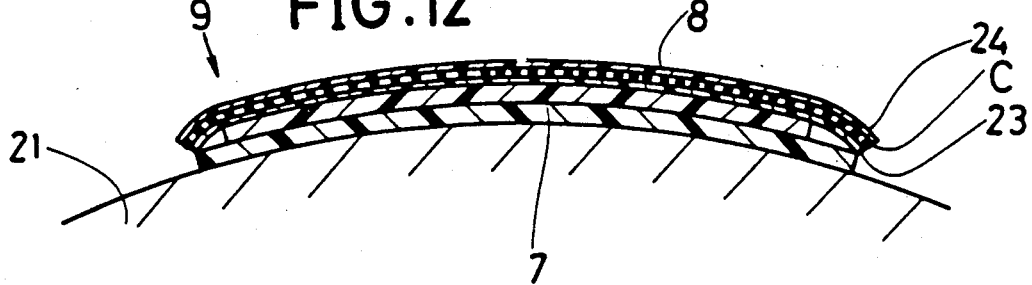

FIG. 12 shows a state that a thin rubber sheet 23 is wound on the outer surface of the belt 7 of two-ply structure wound on the belt drum or belt ring 21, and one to several non-rubber-coated cords C are wound continuously and spirally on the rubber sheet in the circumferential direction at a pitch of 0.5 to 5.0 mm at the belt shoulder portions and 0.5 to 15.0 mm at the belt center portion, and further the second rubber sheet 24 is wound thereon to sandwich the spirally wound cords between the rubber sheets. In this case, as the material for the rubber sheet, it is preferable to use a material having a good adhesiveness with the cord in the same way as the material used as the above-mentioned coating rubber. In case of this embodiment, after winding the second rubber sheet 24, the rubber sheet 24, cord C and the rubber sheet 23 are pressed by pressure rollers to cause the rubber to enter between the cords before winding the tread rubber.

Figure 13:
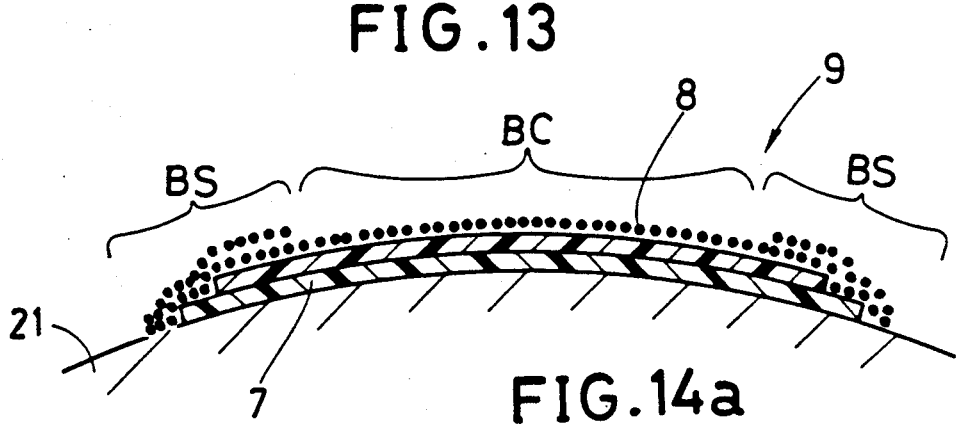

FIG. 13 shows an example of a band composed of a combination of a full band layer and edge band layers.

In this band, the number of layers, number of cords per unit length (density), cord size and pitch can be changed as occasion demands.

Figure 16:
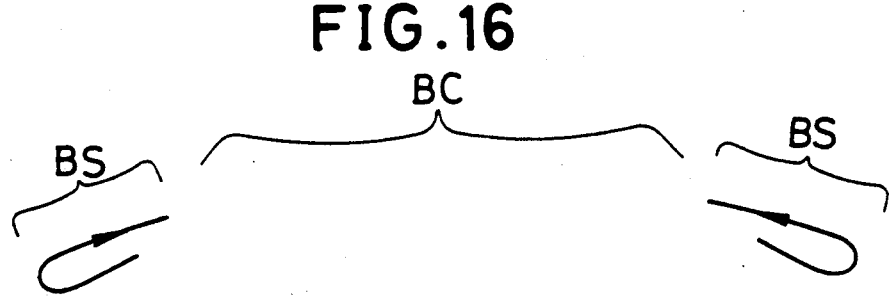
FIGS. 14 to 16 are views showing a manner of winding a cord for forming a band of symmetrical structure.
Figure 14A:
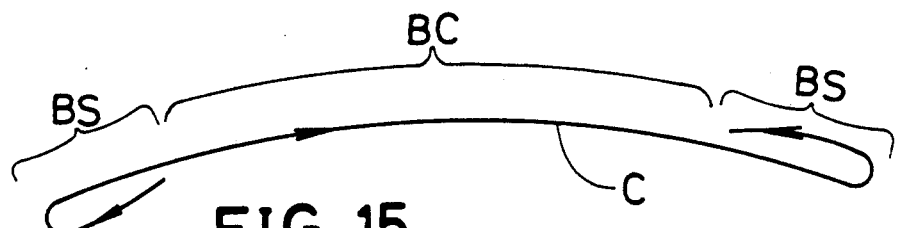
FIG. 14a is a view showing a manner of winding to provide an asymmetrical structure.
Figure 14:
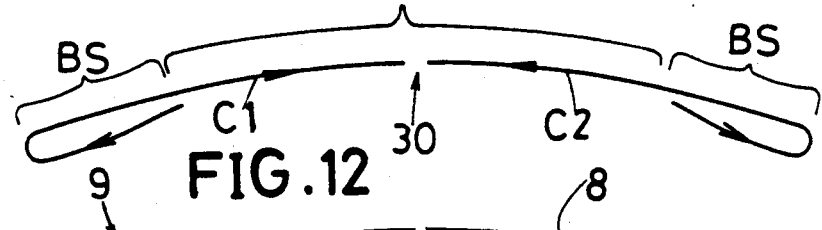

In any cases, winding is conducted so as to be symmetric in structure with regard to the tire equatorial plane in the same way as described above. That is, in case of a structure having two layers at BS portion and one layer at BC portion, there are some methods such as winding cords C1 and C2 from the center position 30 toward both sides symmetrically and folding them over at both edges as shown in FIG. 15, or starting the winding from BS portion and folding it over to return to the center as shown in FIG. 14. In case of winding only on BS portion, it may be wound by folding over at the edges as shown in FIG. 16. Also, FIG. 14a shows a way of winding asymmetrically.

(Comparative Test)

Sample tires in a size of 255/40 VR17 were produced and tested.

These test tires have the sectional structure shown in FIG. 1 and the following basic structure, and they are formed identically except for the band structure.

Basic structure
  Belt material: Metallic cord
  Number of belts: 2 plies
  Belt angle: 24 degrees
  Carcass material: Polyester
  Band material: Nylon 66 1260 d/2 (by single winding)

The test was an indoor durability test using an indoor bench tester, in which test tires having various values of We/Wf from 0 (that is, without any edge band layer) to 0.45 were driven for 20 minutes at prescribed speed by stepping up the speed at 10 km/h increments under the conditions of standard internal pressure and load, and the speed at which each tire was broken (hereinafter referred to as breaking speed) was measured.

Figure 6:
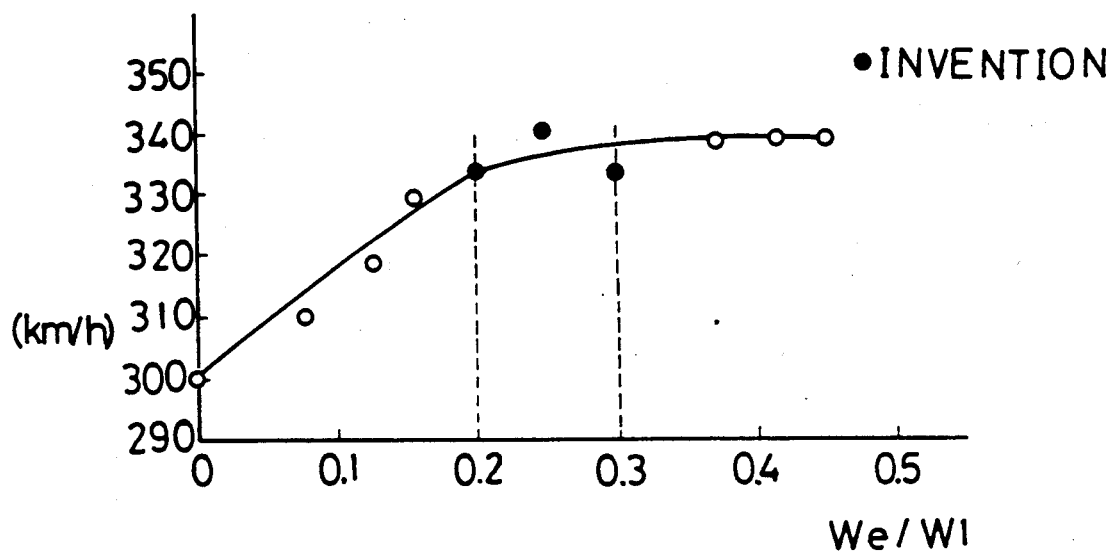
FIG. 6 is a view showing an instance of the relationship between the ratio of the width of edge band layer to the width of full band layer and the rate of breakage of a tire.

FIG. 6 is a graph showing the results, in which the axis of ordinates indicates the breaking speed, and the axis of abscissas denotes the value We/Wf.

It is found from the graph that the breaking speed drastically falls down when We/Wf is smaller than 0.2, and that the breaking speed does not rise remarkably even if We/Wf exceeds 0.3. It was also found that tires having a value We/Wf of more than 0.3 tend to be difficult in controlling in actual car test because the stiffness of the entire tread portion becomes high.

Another three kinds of tires of the same size as above having a sectional structure as shown in FIG. 4 and a structure shown in Table 1 were produced and subjected to the same indoor durability test.

TABLE 1

|  | Example 1 | Example 2 | Com. Ex. |
| --- | --- | --- | --- |
| Tire size | 255/40 VR17 | 255/40 VR17 | 255/40 VR17 |

TABLE 1-continued

|  | Example 1 | Example 2 | Com. Ex. |
| --- | --- | --- | --- |
| Belt material | metal cord | metal cord | metal cord |
| Number of belts | 2 | 2 | 2 |
| Angle of belt | 24 degrees | 24 degrees | 24 degrees |
| Carcass material | polyester | polyester | polyester |
| Structure of band | full band 1 ply joint: none | full band 1 ply joint: none | full band 1 ply joint: present |
| Band material | nylon 66 1260d/2 | nylon 66 1260d/2 | nylon 66 1260d/2 |
| Cord diameter (d) | 0.60 mm | 0.60 mm | 0.60 mm |
| Rubber thickness (t) | 0.15 mm | 0.15 mm | — |
| Pitch (p) | 0.90 mm | 0.90 mm | 0.90 mm |
| Tension of cord in winding (T) |  |  |  |
| Crown part | 35 g | 35 g | — |
| Shoulder part | 45 g | 45 g | — |
| Distribution of elongation under given load of band cord | shoulder part < crown part shown in FIG. 17 | shoulder part > crown part shown in FIG. 18 | shoulder part > crown part shown in FIG. 19 |
| Breaking speed | 350 km/h | 300 km/h | 260 km/h |

Figure 17:
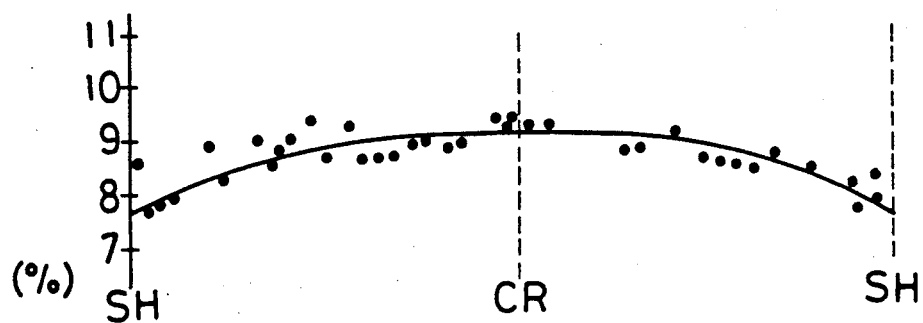
FIGS. 17 to 19 are views showing a distribution of elongation under a prescribed load of a cord of the band of the tire used in a test.

Example 1 has a distribution of elongation at given load of the cord of the full band layer as shown in FIG. 17.

Figure 18:
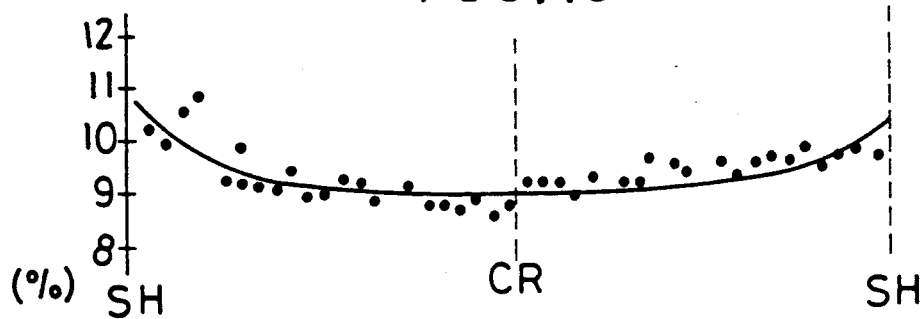

Example 2 is similar to Example 1 in apparent structure, but the distribution of elongation at given load of the cord of the full band layer is reverse to the profile of Example 1 as shown in FIG. 18.

Figure 19:
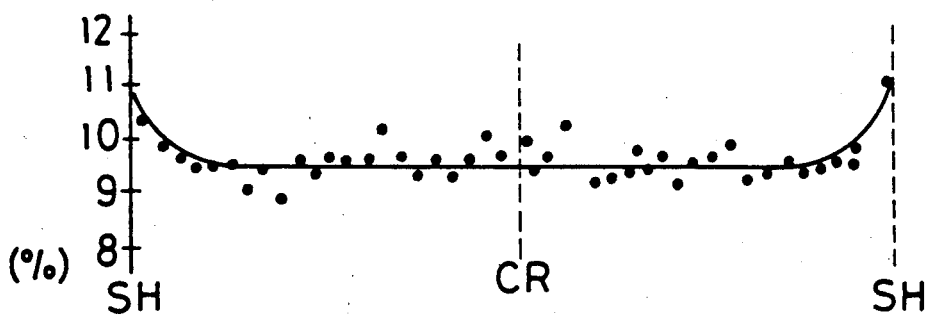

Comparative Example 1 wherein on the belt was provided a conventional full band layer possessing a joint extending in the widthwise direction at one position in the circumferential direction of the tire, has a distribution of elongation at given load of the cord of the full band layer as shown in FIG. 19.

As a result of indoor durability test of these tires in the same conditions as mentioned above, Example 1 of this invention presented a marked improvement effect as compared with Comparative Example, and its durability performance was nearly equal to that of the structure with an intervening edge band layer mentioned above.

Also, in the case of Example 1 wherein the band is formed by gradually increasing the cord tension in winding from 35 g to 45 g from the crown portion toward the shoulder portion, the breakdown level was further raised in comparison to Example 2 in which the winding was conducted at a constant tension of 35 g.

The distribution of stiffness in the peripheral direction of the band at each of various positions in the widthwise direction corresponds very well to the elongation at given load of the cord at each position. The elongation at given load is an elongation (%) at a load determined according to the code specified in JIS L 1017, and the larger this value, the smaller the stiffness in the peripheral direction, and the smaller the elongation at given load, the larger the peripheral stiffness. As shown in FIGS. 17 to 19, it is evident that the distribution tendency of the elongation at given load of the cord of the band is reverse in Example 1, as compared with Comparative Example and Example 2. It means that the peripheral stiffness of the shoulder portion of Example 1 is higher, and as a result, Example 1 possesses a high breaking speed.

Furthermore, in actual car tests, the grip performance of the tire of Example 1 is equal to that of the Comparative Example, and its control performance is the best of the three tires.

As explained above, since one or several organic fiber cords were continuously spirally wound parallel to the peripheral direction on the outer surface of the belt so as to be dense in cord pitch at the belt shoulder portion, and so that the winding tension may be maximum at the belt shoulder portion, thus forming a band, the stretch difference between the belt shoulder portion and the belt middle portion of a vulcanized tire becomes small, whereby the thermal shrinking force at the belt shoulder portion is raised, and accordingly an action of preventing the lifting of belt in traveling is markedly exhibited. Accordingly, separation damage of the belt due to lifting in traveling can be surely prevented.

Furthermore, since the cord has a symmetrical spiral structure with respect to the tire equatorial plane, the uniformity of the tire is excellent. Also, the cord of symmetrical structure is easy to make winding simultaneously, so that the productivity is excellent, too.

The full band layer placed in the entire width of the belt serves to decrease the deformation of the entire tread caused by the centrifugal force applied to the tread portion in the before-mentioned high speed region, while the shoulder edge band layer works to prevent the lifting and standing wave phenomena.

Therefore, there can be controlled the deformation of tread due to centrifugal force occurring in tires used in high speed region of over 200 km/h or even faster than 300 km/h, in particular in superflattened tires with a flat ratio of 50% or less, whereby the damage resulting from this deformation can be prevented, and accordingly the durability performance can be improved without decreasing other necessary traveling performances.

Besides, when the full band layer possesses such a distribution that the elongation at given load of the organic fiber cords contained therein becomes smaller as approaching closer to the shoulder portion, the combined effect of the shoulder edge band layer and the full band layer can be obtained by one layer of full band.

Next is explained the method of forming the assembly of belt, band and tread rubber of this invention.

This invention relates to a step of forming an integral assembly of belt, band and tread rubber by using a belt drum of which diameter can be expanded or contracted, in manufacturing processes of radial tires, and with respect to other steps, conventionally known forming steps of radial tires can be adapted.

What is completely different between this method and the conventional method wherein both the belt and band are formed in a cylindrical shape is that first the belt is formed cylindrically as in the conventional method, but the band is formed from the outset in a shape finally finished in a mold or in a similar shape. This is the most characteristic point of this method. To this method it is also applicable to form the band in a convex shape so that the difference between the stretches of the organic fiber cord of the band at its center portion and shoulder portion is within 2%, or to wind the organic fiber cord at a specified winding tension, or to wind the cord at a specified winding pitch.

The final finished shape in mold of the band means, as shown in FIG. 20, the sectional shape in the axial direction (contour) of the band 8 of the finished tire in the mold M when the vulcanization of tire is over, and it is a convex or arc shape.

The stretch of band means the percentage of the finished diameter (CD0, SD0) to the winding diameter (CD1, SD1) as shown in FIGS. 20,21. The winding diameter, in turn, refers to the diameter when the band 8 is wound on the radially outer side of the belt 7 on the belt drum 21, while the finished diameter indicates the diameter when expanded to the final finished shape of the band in the mold M by the shaping internal pressure P in vulcanization.

The middle portion stretch is (CD0/CD1-1)×100 (%), for example, 2.5%, and the shoulder portion stretch is (SD0/SD1-1)×100 (%), for example, 1.5%.

In this invention, the sectional shape in the axial direction of the band 8 in the assembly of belt, band and tread rubber formed on the belt drum 21 is formed in a convex shape such that the difference between the both stretches falls within a range of 0% to 2%.

In case that the difference of both stretches is within 2%, the radius difference a1 at the middle portion between the radius when forming the middle portion of the band 8 and the radius when finishing in the mold, and the radius difference b1 at the shoulder portion between when forming the shoulder portion and when finishing in the mold are equal to or nearly equal to each other, as shown in FIGS. 20 and 21. That is, the center portion radius difference and the shoulder portion radius difference becomes identical or nearly identical, thus the band exhibits a sufficient hooping effect even at the shoulder part of the belt.

When the difference of both stretches exceeds 2% wherein the center portion stretch is larger than the shoulder portion stretch, the result becomes similar to that of a conventional method using a belt drum 22 being linear in axial section as shown in FIG. 22, and hence it is not preferable because no sufficient hooping effect of the band is exhibited at the shoulder portions of the belt as mentioned above.

In contrast with this, when the stretch difference exceeds 2% such that the shoulder portion stretch is larger than the center portion stretch, the radius at the shoulder portion becomes relatively small at the time of winding the band cord. Therefore, a gap is easy to be formed between the outer surface of the shoulder portion and the inner surface of a mold when placing the raw tire in the mold for curing. Consequently, the belt, particularly its edge portion, stretches in excess by inner pressure applied upon curing, thus this portion is easy to be abnormally deformed, resulting in defective tire.

Accordingly, the stretch difference should be kept within a range of 0% to 2%.

Figure 23:
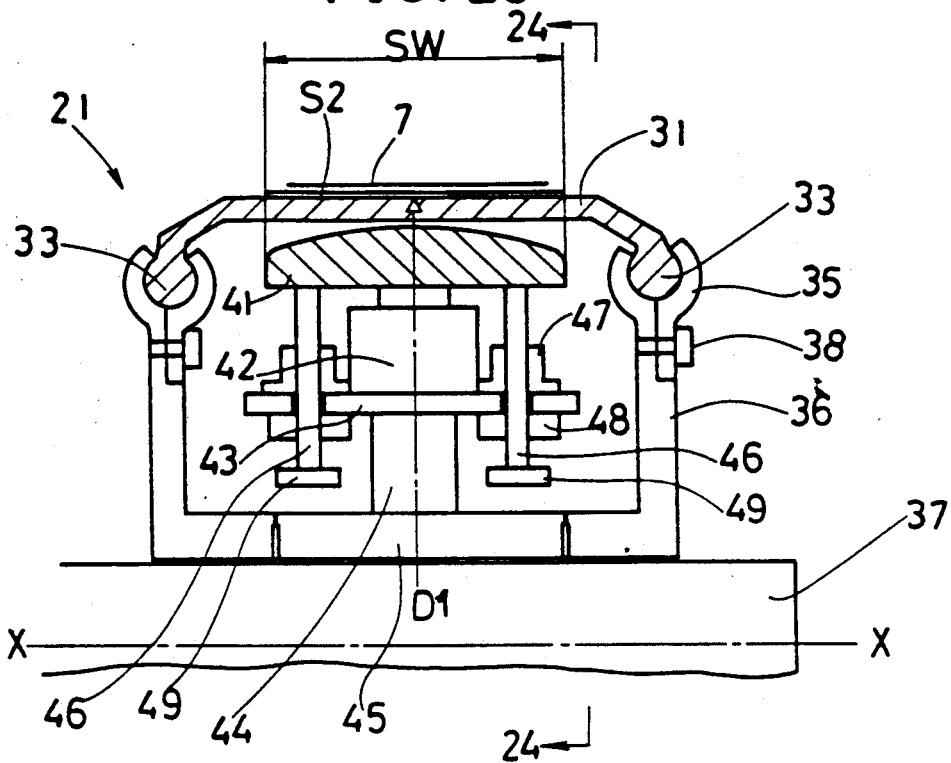
FIG. 23 is an axial section view showing an embodiment of an apparatus for forming the belt-band-tread rubber assembly of this invention.

The belt is formed in a cylindrical shape by winding a plurality of rubberized belt plies composed of inorganic fiber cords such as steel or organic fiber cords such as an aromatic polyamide arranged at an angle of 10 to 40 degrees with respect to the circumferential direction and woven in the form of cord fabric onto non-expanded cylindrical belt drum 21 as shown in FIG. 23 so that the cords of one ply cross the cords of the other ply. Also, the band formation may be conducted (1) by winding only one ply, (2) by winding 2 or more plies, or (3) by winding one ply and thereafter winding to form 2 plies only in the both shoulder zones.

In another embodiment, the band may be formed by cutting a long sheet in the form of cord fabric composed of a multiplicity of organic fiber cords and coated with a rubber to a width covering the full width of a belt, cutting it to a length at least equal to the length of the circumference of the belt plus overlapping joint width, dividing it in the widthwise direction into three or more tapes, and winding them in order on the belt over the full width thereof at an angle of approximately 0 degree with respect to the circumferential direction.

In the above embodiment, the winding tension is constant in principle. Also, if the cord angle of band exceeds 5 degrees, so-called hooping effect (an effect of preventing a growth of the belt layer, namely the lifting, by fastening the belt layer tight over the full circumference like a hoop) is not sufficiently exhibited.

Described below is an embodiment of a device for forming the assembly of belt, band and tread rubber of this invention used in execution of the above forming method.

The forming device has a belt drum of which diameter can be expanded or contracted.

Figure 25:
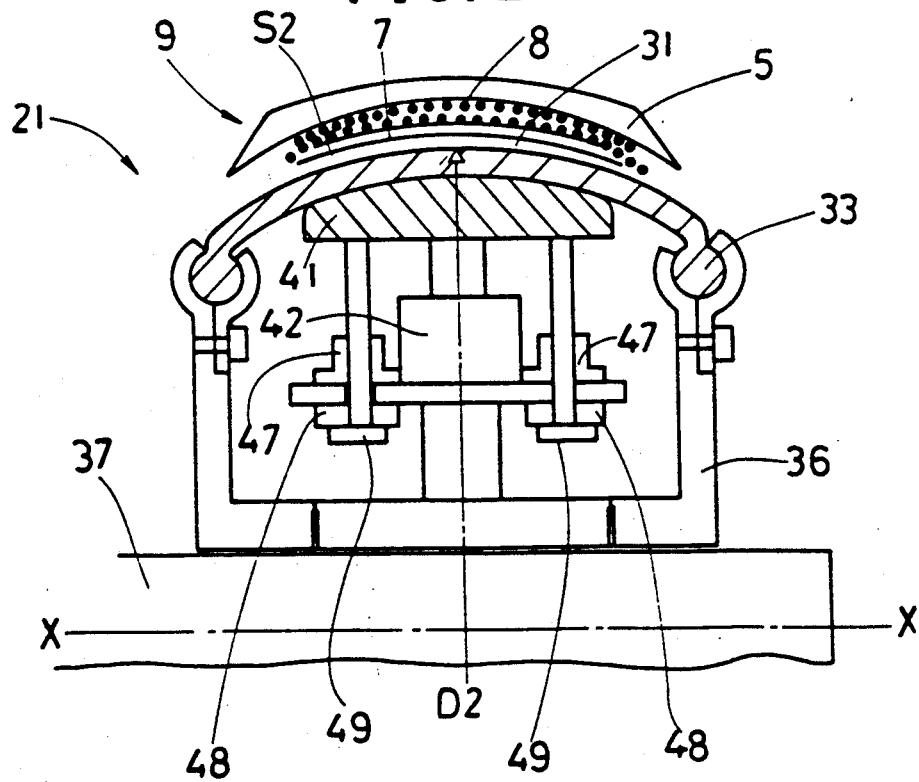
FIG. 25 is a section view showing a diameter-expanded state of the apparatus.
Figure 24:
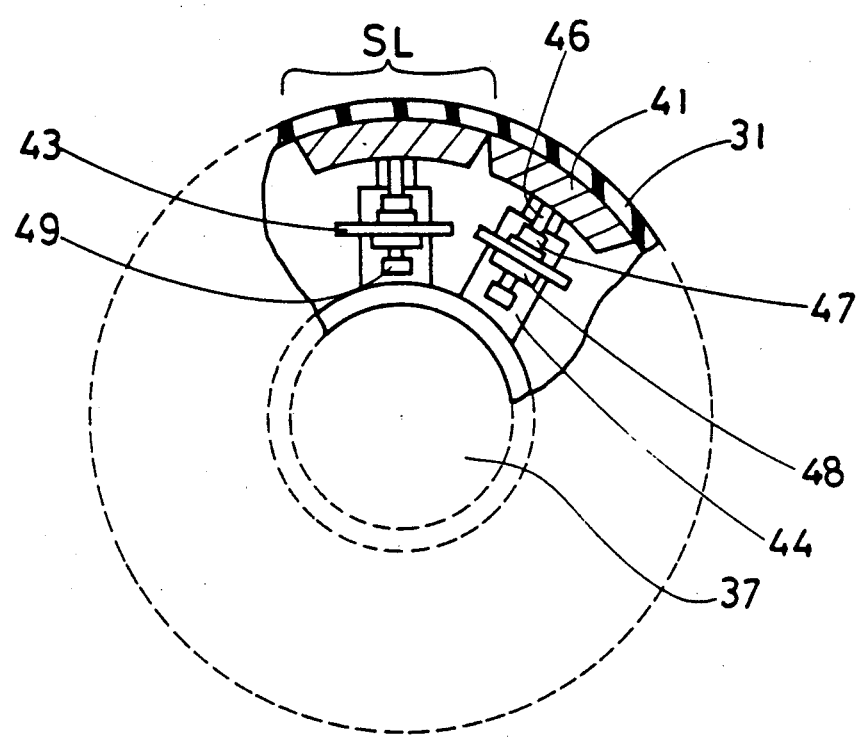
FIG. 24 is a section view taken along the line 24—24 in FIG. 23.

In FIGS. 23 to 25, belt drum 21 has an extendable forming annular body 31, and a diameter expanding means 32 for expanding or contracting the outer diameter of the forming annular body.

The forming annular body 31 is composed of an elastomer material (for example, polyurethane or hard rubber) of which JIS-A hardness is 70 to 98 degrees and thickness is uniform (for example, 5 mm to 30 mm), and it possesses an outer circumference continuous in the peripheral direction. If the hardness is less than 70 degrees, when the segment method described below is used as the means for expanding and contracting the diameter, the portion to cover the gap between segments is recessed, and the entire forming annular body does not form a desired roundness on the forming plane.

The forming annular body possesses a pair of large diameter parts 33 at its both edges. Each large diameter part is detachably supported by a pair of clamp rings 35, 36. One clamp ring 36 is fixed to a shaft 37, while the other clamp ring 35 is fixed to the first clamp ring 36 by bolt 38.

The majority of the outer circumferential surface S2 of the forming annular body forms a forming surface to be wound with belt 7, as shown in FIG. 23, when not expanding the diameter, with the sectional shape in the axial direction presenting a linear form. When expanding the diameter, as shown in FIG. 25, the sectional shape in the axial direction of the forming surface is the same as or close to the sectional shape in the axial direction of the band in the finished tire in a mold, and more particularly presenting a convex shape of which difference between the center portion stretch of the band and the shoulder portion stretch is within 2%, thus the already wound belt 7 is deformed in the same shape, and the winding forming surface for the band 8 is presented.

The first embodiment of the diameter expanding means is the one particularly called as segment method by the present applicant, and as shown in FIGS. 23 to 25, a plurality of segments 41, for example, 8 to 32 segments, having the predetermined width and length are arranged over the entire circumference radially inside of the forming annular body.

The segments 41 are made of a hard material, such as aluminum and iron. The sectional shape of each segment in the axial direction of the drum is the same as or similar to the sectional shape (final finished shape) of the band of the finished tire in the mold, and more practically a convex shape of which absolute value of the difference between the middle portion stretch of the band and the shoulder portion stretch is 0% to 2%. The length SL of each segment is determined by the number of segments, and the width SW is determined by the belt width.

Each segment is mounted on the rod of cylinder 42, and each cylinder is fixed to the base frame 12, and the base frame 43 is supported by a post 44, and the post is set up on a base 45, and the base is fixed to the shaft 37. The both ends of the base in the axial direction are abutting against the lower end of the clamp ring 36. Inside the both sides of each segment in the axial direction, a pair of guide rods 46 are set up toward the axial center X of the shaft 37. The guide rods penetrate slidably through the holes provided in the base frame and the guides 47, and a stopper 49 is fixed at the radially inner end of each rod.

Figure 26:
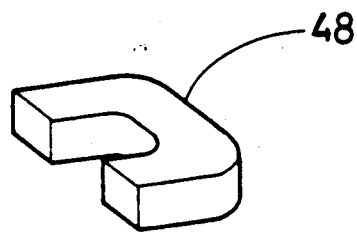
FIG. 26 is a perspective view showing its outer diameter defining member.

Inside the base frame 43 (at the drum shaft side), a drum outer diameter defining member 48 with a magnet (FIG. 26) is detachably mounted so as to surround the guide rod.

As shown in FIG. 25, when the forming annular body is expanded in diameter as the segments advance in the radial direction by the going stroke of the cylinder, the stopper 49 hits against the outer diameter defining member 48, thus a desired expanded drum outer diameter D2 is obtained. At this time, the sectional shape in the drum axial direction of the outer circumferential surface S2 of the forming annular body 31 is, as shown in FIG. 25, similar to the shape of the segment in the widthwise direction. That is, the sectional shape in the axial direction of the outer circumference of the forming annular body is deformed into the same or similar shape of the final finished shape in the mold of the band. Concretely, it is deformed into a convex shape such that the absolute value of the difference between the stretches at the center portion and shoulder portion of the band is from 0% to 2%.

By the returning stroke of the cylinder, each segment periodically retreats in the radial direction, and the forming annular body becomes a non-expanded state. The outer surface S2 of the forming annular body at this time is, as shown in FIG. 23, linear in section in the axial direction of the drum, thus forms a belt winding and forming surface (non-expanded drum outer diameter D1).

Figure 27:
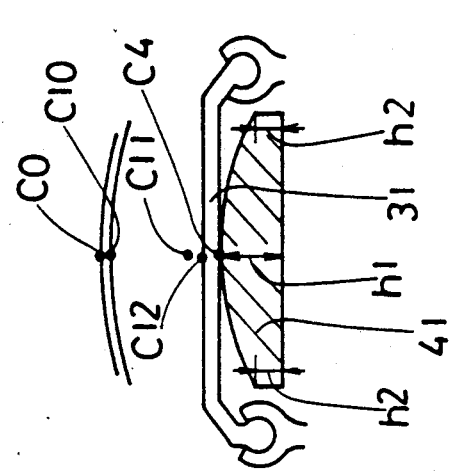
FIGS. 27 and 28 are views showing a manner of finding the shape in axial section of the above-mentioned apparatus in diameter-expanded state.

This is an example of a practical technique for designing the shape of the segment in the drum shaft direction (widthwise direction) in a convex shape of which absolute value of stretch difference between the middle portion and shoulder portion of the band is within 0% to 2%. For example, if the tire size is A and stretch difference is 0%, an arbitrary value is selected from the effective stretch range of 1.0% to 5.0% (preferably 2.0% to 3.5%) for the belt middle portion, for example, 2.5%. Next, as shown in FIG. 27, on the basis of the profile P1 (convex solid line) of the sectional shape in the axial direction of the band (final finished shape) of the finished tire mentioned in the tire structural design sectional drawing, points 2.5% remote from the middle portion C0 point and end portion E0 point in the axial line X-direction, that is, the points at which difference of the middle portion stretch and shoulder portion stretch is zero (E1, C1, E1) are specified on the drawing. Linking these points, a profile P2 is obtained. This profile P2 has a similar figure to profile P1. Further, points E2, C2, E2 shifted by a distance corresponding to the belt thickness in the axial line X-direction are linked. This profile P3 is the axial section profile of the surface of the forming annular body in the diameter expanded state. Linking points E3, C3, E3 shifted parallel in the axial line X-direction by the portion of the design thickness d of the forming annular body from the profile P3, a profile P4 is obtained. This profile 4 is the sectional shape of the segment to be obtained when the tire size is A, the band middle portion stretch is 2.5%, and the stretch difference between the middle portion and shoulder portion is 0%. Therefore, point C3 corresponds to the peak of the segment in expanding mode.

Figure 28:
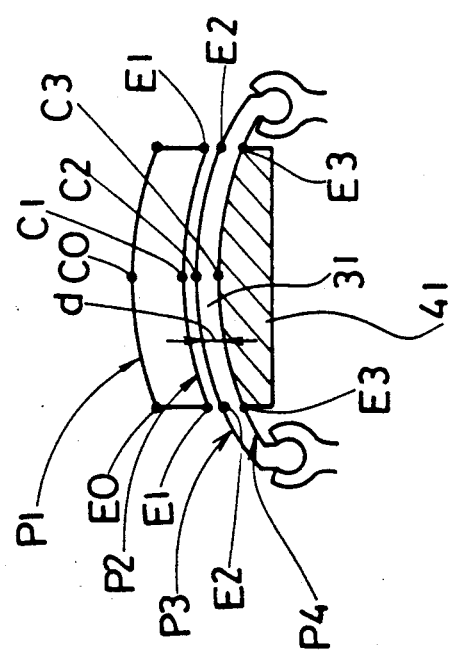

In FIG. 28, if C0 is the center position of finished band, C10 is the center position of finished belt, C12 is the center position of the non-expanded surface of the forming annular body, and C11 is the center position of the wound belt, point C11 is the point shifted somewhat in the axial line X-direction from the end E1 of the profile P2 in FIG. 27 (as a result, it becomes possible to take out the assembly of the belt, band and tread after the completion of forming from the forming annular body in non-expanded state), and the point further moved in the axial line X-direction by the portion of material thickness is the middle position C12 of the surface of the non-expanded forming annular body. The point C4 further moved from this point in the axial line X-direction by the thickness d of the forming annular body corresponds to the peak of the segment 41 in the non-expanded state.

Meanwhile, the thickness h1 of the middle portion of the segment and thickness h2 of the shoulder portion may be arbitrarily designed in consideration of the required strength and the positional relation with other constituent parts.

As stated above, the fastening force of the band at the shoulder portions of the belt can be prevented from lowering by setting the difference in stretch within 0% to 2%. This stretch difference can also be achieved, for instance, by using a conventional belt drum linear in axial section shape as shown in FIG. 22 as well as the case using a belt drum having the above-mentioned convex shape as shown in FIG. 25. That is to say, the cord is slackened at the belt center portion upon winding the band cord or is wound with a very small winding tension so that the shape of the belt when the tension is substantially acted on the band cord by application of inner pressure in a curing mold becomes substantially the same as the convex shape as shown in FIG. 25. The pneumatic radial tires of this invention comprehend the tires formed by such a process.

The operation of the belt drum having the diameter expanding means of the above segment system is explained below together with an embodiment of a method for forming the assembly of belt, band and tread rubber.

As shown in FIG. 23, when air cylinder 42 is in the unoperated state, and therefore, the segments 41 and the forming annular body 31 covering the outside thereof are in non-expanded state, two belt plies made of steel cords having a cord angle of 20 degrees with respect to the circumferential direction are overlaid in the mutually intersecting directions to form a cylindrical belts 7 on the outer surface S2 (drum outer diameter D1) of which sectional shape in the axial direction is linear, of the forming annular body of the belt drum 21.

In succession, as shown in FIG. 25, each air cylinder acts in the going stroke, and each segment moves in the radial direction, and the movement is stopped by stopper 49 of each segment hitting against the outer diameter defining member 48. Thus the sectional shape in the axial direction of the outer surface of the forming annular body is deformed into the same or similar convex shape (drum outer diameter D2) of the final finished shape of the band, and as a natural consequence, the belt wound thereon is similarly deformed in a convex shape.

Then, a rubber-coated single nylon cord is spirally wound continuously in the circumferential direction by using a device described after, at an angle of about 0 degree with respect to the circumferential direction on the radially outside of the deformed belt over at least its entire width so as to cover the deformed belt. If the above angle exceeds 5 degrees, the hooping effect (effect of preventing the growth, namely lifting, of the belt by tightening the belt over the full circumference like a hoop) is not sufficiently exhibited.

Similarly winding again thereon over the entire width, band 8 of a two-layer structure is formed. In addition to such a two-layered full band structure, the band may be formed, for example, into a structure composed of only full band single layer, a structure composed of 3 or more layers of full band, or a structure composed of at least one layer of full band and edge band wound on the both edges of the belt.

Then, a tread rubber in a belt-like shape cut into a prescribed size is wound radially outwardly of this band, and successively the tread rubber is pressed by a pressure-fitting roller (not shown), whereby the belt, band and tread rubber is pressed tightly and sufficiently into one body.

By these steps, an assembly 9 of belt, band and tread rubber is formed.

A second embodiment of the diameter expanding means is particularly called the internal pressure system by applicant, and it comprises, as shown in FIGS. 29 and 30, a clamp ring 51 for holding the both ends of the forming annular body 31, a post 44 for supporting the entire structure, a base 45 linking with the rotational shaft, and an air intake and discharge port 24. The forming annular body and clamp ring are sealed so as to shut off air leaks. The forming annular body is inflated with internal air pressure, whereby the structure of the forming annular body becomes convex in the axial direction. This convex shape varies depending on the internal air pressure, distribution of thickness d of the forming annular body and the width W thereof. The required convex shape is designed in the same concept as in the segment type. That is, on the basis of the convex shape of the tire structural drawing, a shape at the position lowered by 2.5% is drafted, which determines point D2 and shape (FIG. 31). To reproduce this shape, the outer diameter D, thickness d, and width W (which is usually determined wider than the belt width) of the forming annular body when the internal pressure is zero, and the internal pressure P are determined where, as shown in FIGS. 29 to 31, the thickness d is largest at the center of the forming annular body and decreases toward each edge thereof. Therefore, this forming annular body presents, at internal pressure P2, a band winding and forming surface of the same or similar convex shape as the sectional shape of the band (final finished shape) of the finished tire.

The operation of the belt drum having the diameter expanding means of this internal pressure system is as follows.

The forming annular body 31 has a rather concave surface in the axial section shape when the internal air pressure is zero as shown in FIG. 29. Therefore, the internal pressure is raised to P1 (about 0.5 kg/square cm), whereby the sectional shape in the axial direction is made nearly linear as shown in FIG. 31, and a belt 7 is formed on its outer circumference (drum outer diameter D1) in the same manner as in the above embodiment.

Next, as shown in FIG. 31, the internal pressure is raised to P2 (for example, 2.0 kg/square cm), whereby the forming annular body is expanded to increase the diameter, thus the sectional shape in the axial direction is deformed to the same or similar convex shape as the final finished shape of the band. Therefore, the belt wound thereon is similarly deformed, too.

Band 8 is formed radially outwardly of this deformed band 7 in the same manner as in the foregoing embodiment by using a device mentioned below.

Then, outside this band 8 in the radial direction, a tread rubber 5 is wound in the same manner as in the above-mentioned embodiment, thus assembly 9 of belt, band and tread rubber is formed.

In the above-mentioned embodiment of the method for forming the belt-band-tread rubber assembly of this invention, the winding tension of the band cord is constant in principle. According to the other embodiments or this invention, (a) the winding can be made so as to have a tension distribution such that the winding tension is maximum at the belt shoulder portions and is minimum at the belt center portion, (b) the winding can be made so that the winding pitch of the band cords is from 0.5 to 5.0 mm at the belt shoulder portions, and (c) these (a) and (b) can be combined.

The entire method for manufacturing radial tires including the band forming method of this invention is illustrated with an embodiment below.

Figure 32:
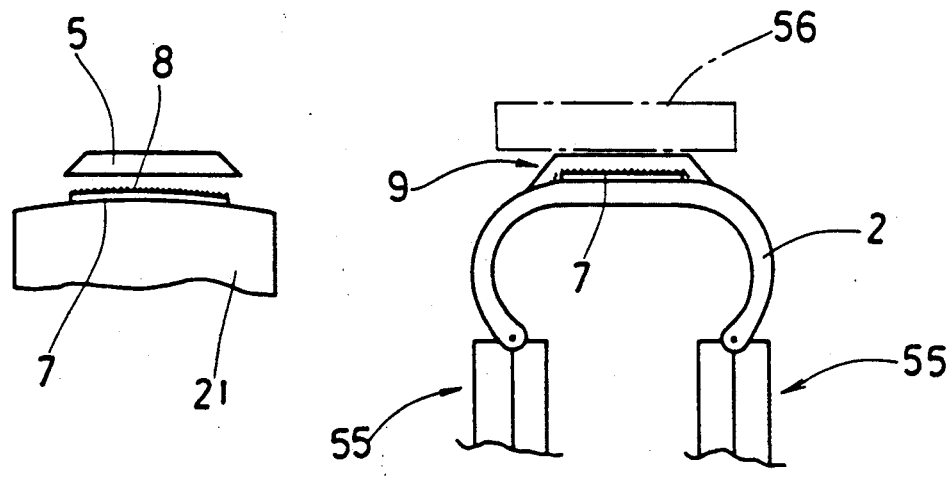
FIG. 32 is a view showing a step in a method for producing radial tires.

As stated above, the assembly 9 of belt, band and tread rubber formed on the belt drum 21 is conveyed onto a tire forming drum 55 by means of a transfer ring (not shown) waiting between the tire forming drum 55 and belt drum 21 as shown in FIG. 32. This conveying ring holds the outer circumference of the assembly 9 made into one body by contraction of its diameter.

The cylindrical carcass 2 on the tire forming drum is deformed into a toroidal shape, and the both bead holding tools are synchronously moved inward in the axial direction, and the inflated outer surface of the carcass is pressed to the entire width of the inner surface of the belt 7 of the waiting assembly 9.

When the transfer ring returns to the waiting position, a stitcher roller 56 presses the tread 5, thus the assembly 9 is press-fitted to the carcass 2, thereby completing a raw tire.

The band forming apparatus of this invention is described below with reference to FIGS. 33 to 35. The band forming apparatus has a winding device 14 for winding a cord. When it is combined with a belt drum, there can be provided an apparatus for forming a belt-band-tread rubber assembly. In that case, the belt drum may be a drum having a linear band forming surface as conventionally used.

The band forming apparatus of this invention is described below with reference to FIGS. 33 to 35.

The band forming apparatus has a winding device 14 for winding a cord.

This winding device 14 comprises a let-off means 73 for drawing out the cord C to be wound toward the belt drum 21, a traverse means for traversing the let-off means in the belt widthwise direction, and a traverse control means for controlling the traverse of the let-off means. To this basic construction may be further added a tension control means for controlling the cord winding tension.

This traverse means comprises a pair of guide shafts 72, and a screw shaft 71 disposed between them and rotated and driven by a motor 108. Each guide shaft and screw shaft are supported by a frame 70 in the both end portions. The screw shaft is screwed to the let-off means, and its rotation causes the let-off means to traverse. The guide shaft guides this traverse.

The let-off means 73 is screwed to the screw shaft 71, and it is passed through by the guide shaft 72 and possesses a moving frame 73a which is supported so as to be capable of traversing.

In the upper part of the moving frame 73a, there is provided an arm 77 for rotatably supporting a plurality of guide pulleys 75d to 75f. The arm 77 has a support bar 78a which has a guide roller 78 rotatably attached to the end thereof.

This arm 77 is slidably supported in the belt drum direction by a guide rail 73c disposed in the upper part of the moving frame 73a, and it is always thrust toward the belt drum 21 by the spring 85. As a result, said guide roller 78 is press-fitted to a copying plate (drum shaft direction moving guide means) 79 disposed on the frame 70, and therefore the let-off means 73 is moved and guided in the belt widthwise direction while keeping a specified spacing to the surface of belt drum.

The copying plate 79 is formed identically with the sectional shape in the axial direction of the belt drum. As a result, the spacing between the belt drum surface and the cord let-off means becomes uniform, thereby preventing overlapping of cords or irregularity of cord intervals experienced when not uniform. In the case where the belt drum is expandable in its diameter as mentioned before and the shape in axial section of the drum at the time of band formation is deformed into the same or similar convex shape as the shape of finished band in a mold, the copying plate having the same convex shape is used. Also, in the case where the sectional shape is linear, the copying plate should be linear.

Incidentally, the arm 77 may be integrally fixed to the moving frame 73a.

The traverse control means is to control the movement of the let-off means to the start position or end position of cord winding or to the changing point of winding pitch or winding tension, and also to control the winding pitch by synchronizing the winding pitch with the belt drum rotating speed (constant). It comprises a servo motor 108 with encoder for driving to rotate the screw shaft 71, its drive unit 93, and rotation pulse counter 91 for the belt drum 21.

The servo motor may be a DC motor, and the drive unit is, for example, a digital servo positioner "Position pack 1D" made by Yasukawa Electric Co. When an AC motor is used as the servo motor, it is needless to say that the above-mentioned drive unit is not required.

In case of winding the cord at a predetermined tension, a tension control means is necessary.

This tension control means is comprised of a brake pulley 74 rotatably supported by the moving frame 73a of the let-off means 73, a press roller 74a being thrust to the guide pulley side by spring 86, a powder brake 74c coaxially provided with the brake pulley 74, and a power supply unit 92 for causing the powder brake 74c to generate a rotational resistance corresponding to a predetermined winding tension, thereby providing the cord C with a predetermined tension. The power supply unit is, for example, DMP type power supply box DMP manufactured by Shinko Electric Co.

Therefore, by threading this brake pulley 74 with cord C, it is possible to send out and wind the cord around the belt drum through the guide pulley 75 at a predetermined tension.

It is needless to say that the power supply unit is not necessary, when a mechanical brake such as air brake is used.

On the other hand, in a setting board 106, winding start position, winding end position, single or plural winding pitch set values, single or plural winding tension set values, winding pitch changing position, winding tension changing position and other data are set.

A control unit 90, which is a sequencer or a relay, is connected with the setting board, an encoder 61 through counter 91 in order to put in the rotation speed of the drum, and the power supply unit 92, respectively. The control unit is designed so that brake pulley 74 provides the cord with a predetermined winding tension.

The control unit is also connected with a drive unit 93, and by the output from the drive unit 93, the servo motor 108 is driven to rotate the screw shaft 71, so that the let-off means 73 is traversed to the predetermined direction and position at a predetermined speed as described above.

The cord winding device 14 has the lower end of the frame 70 slidably supported by guide rails 70a, so that the spacing between the end of arm 77 and belt drum 21 can be adjusted.

Figure 35:
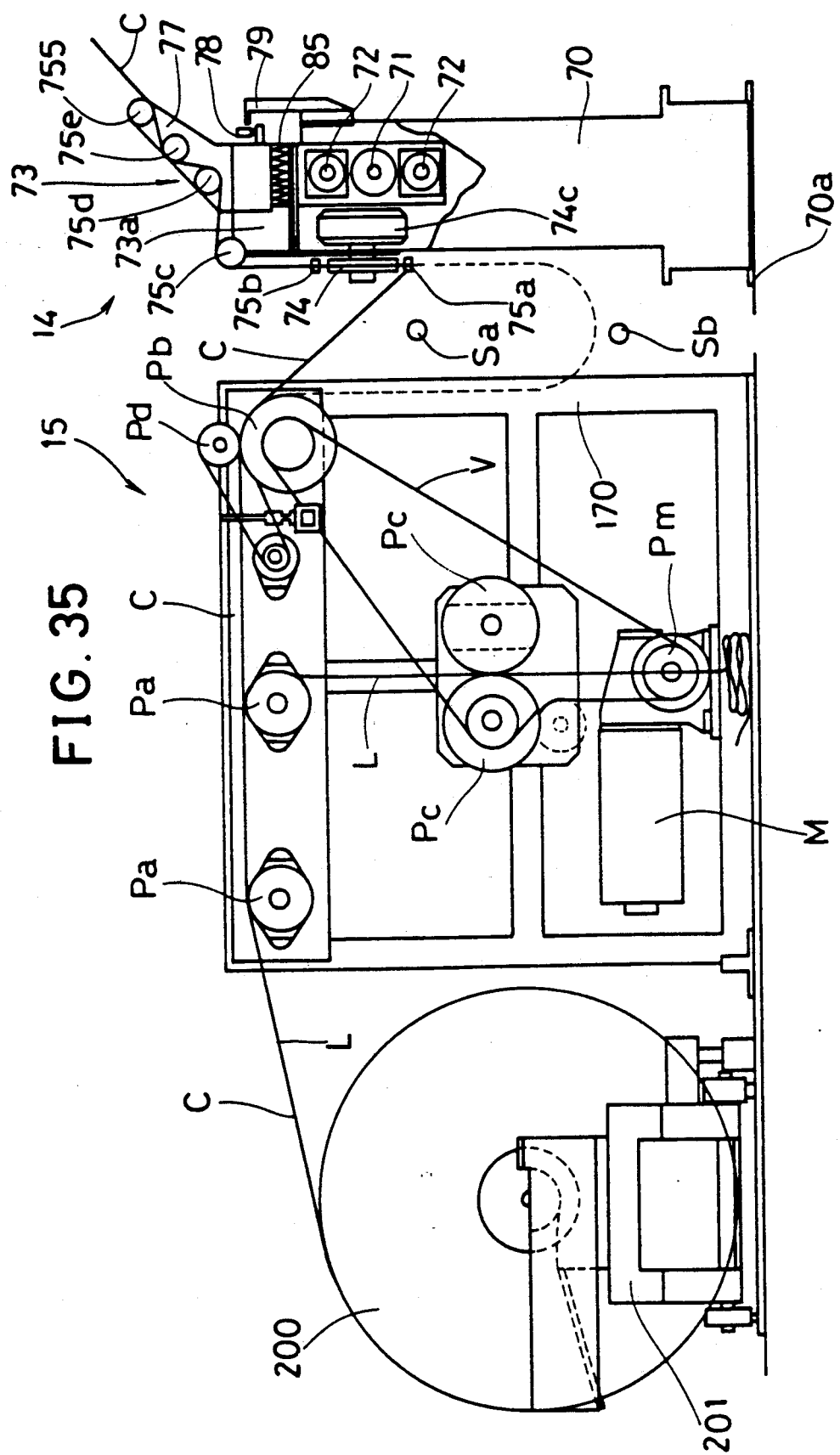
FIG. 35 is a view showing an instance of use thereof.

Cord send-out device 15 has, as shown in FIG. 35, guide pulley Pa, send-out roller Pb and press roller Pd which are disposed in the upper part of the frame 170, a pair of pull rollers Pc in the middle part, and drive pulley Pm in the lower part.

The rotating force of the drive motor M is transmitted to the pulleys Pb, Pc through belt V applied on them and pulley Pm.

A cord take-up roll 200 is rotatably mounted on a let-off stand 201, and around the roll the cord C is rolled with liner L or a cord having a coating rubber whose surface is coated with a sticking preventing agent is wound without liner. The pull rollers Pc draw out the liner L through their rotation, and the send-out roller Pb and the press roller Pd send out the cord C toward the winding device 14 while the guide pulley Pa is guiding the cord C.

The cord being sent out is led to the guide pulley 75a of the let-off means 73 disposed on the frame 70.

When not applying a specified winding tension to the cord by means of the tension control means, the cord is passed through the guide pulley 75a, and then only through guide pulleys 75a to 75f without passing through brake pulley 74, thus letting off the cord onto the belt drum 21. As a result, a slight tension due to only resistance of the guide pulley itself is applied to the cord (so-called tension-free state). In this case, as shown in FIG. 35, a pair of phototubes Sa, Sb are disposed above and below between the frame 70 and frame 170. The cord between the send-out roller Pb and guide pulley 75a is slackened in U-form, and the upper limit and lower limit of this slack are detected by the phototubes Sa, Sb, whereby the cord feed rate is adjusted (so-called festoon).

Figure 36:
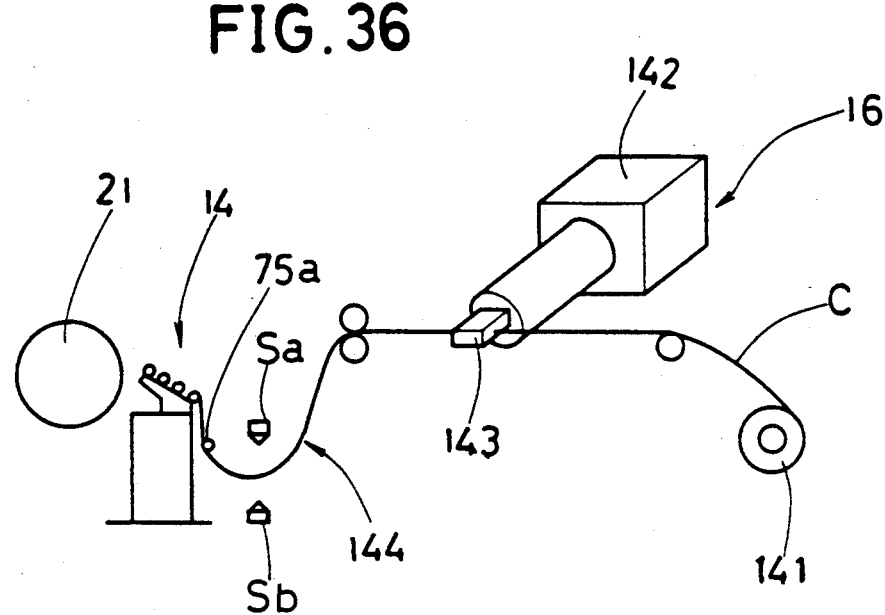
FIG. 36 is a view showing another instance of use thereof.

Incidentally, as shown in FIG. 36, it is also possible, without using such a send-out device, to connect the winding device 14 directly to a rubber coating device 16 for cord C, and to lead the rubber-coated cord directly to the guide pulley 75a of the let-off means 73 of the winding device sequentially without once taking up on the take-up roller. In the drawing, numeral 141 shows a cord take-up bobbin, 142 is an extruder, 143 is an extrusion die, 44 is a cord festoon, and 21 is a belt drum as mentioned before. In this method, since the cord is wound on the belt while coating with rubber, deterioration of material and entry of foreign matter (sticking preventing agent, etc.) may be prevented as compared with the foregoing take-up roll sending-out method. Moreover, because of hot feeding, the adhesion between the belt and the cord is large, and also the take-up liner is not needed.

Figure 37:
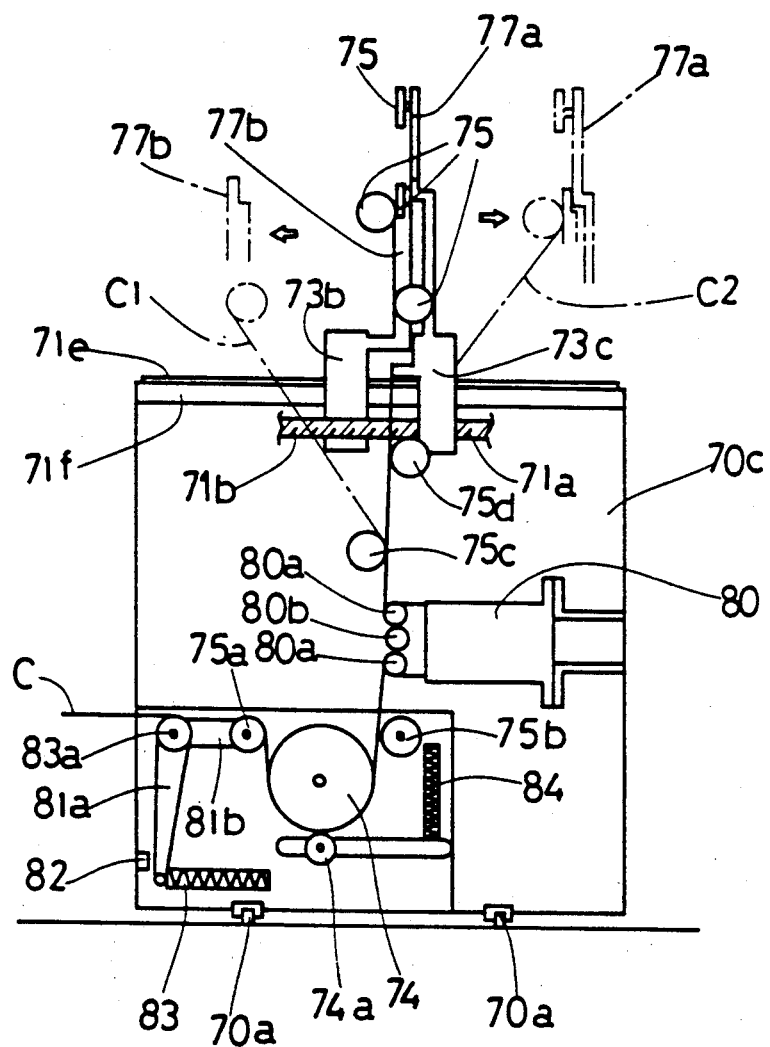
FIG. 37 is a front view showing another embodiment of the band forming apparatus of this invention.
Figure 38:
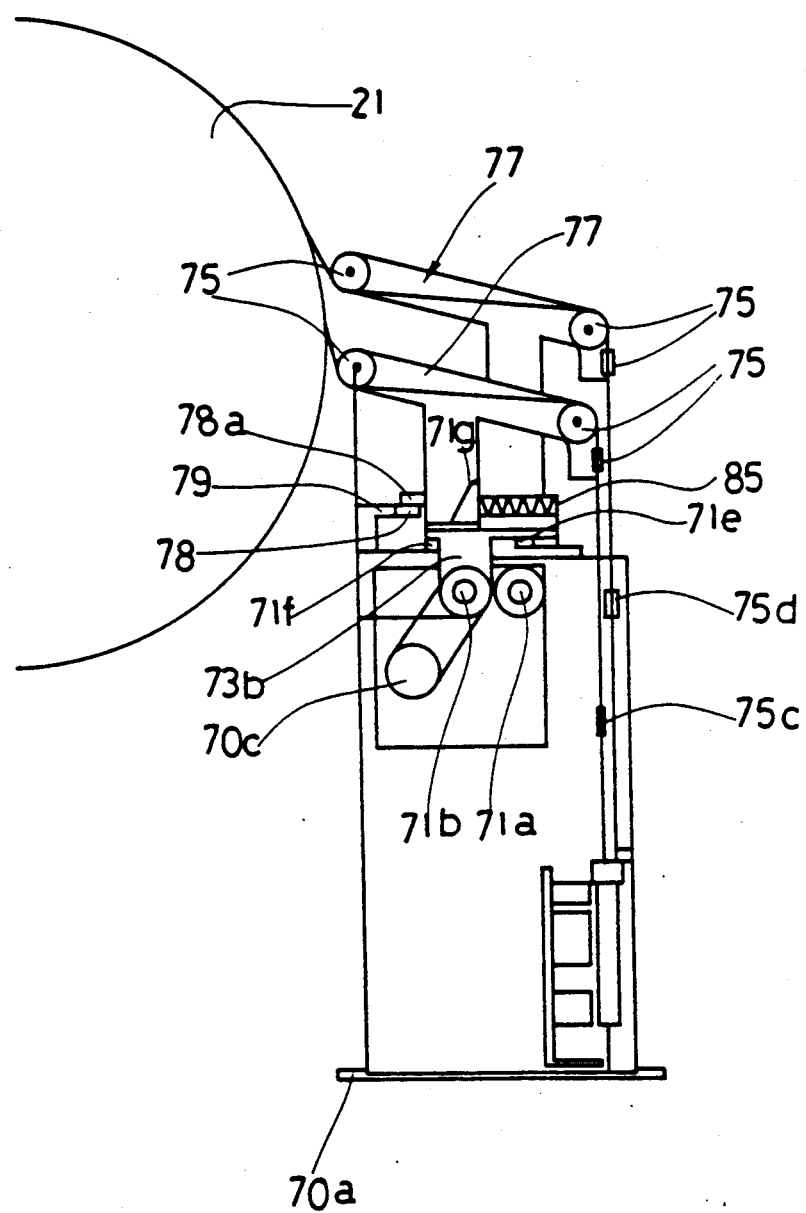
FIG. 38 is a side view thereof.
Figure 39:
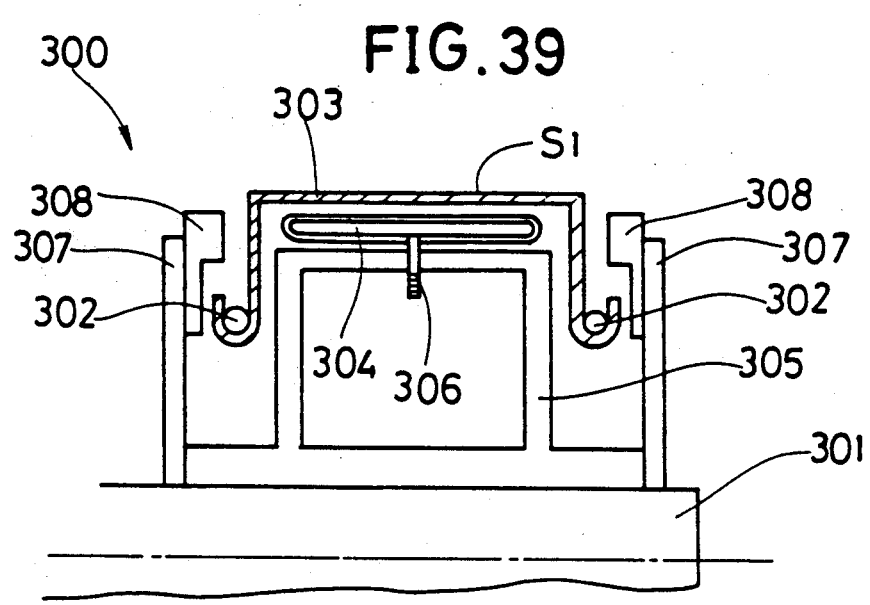
Figure 40:
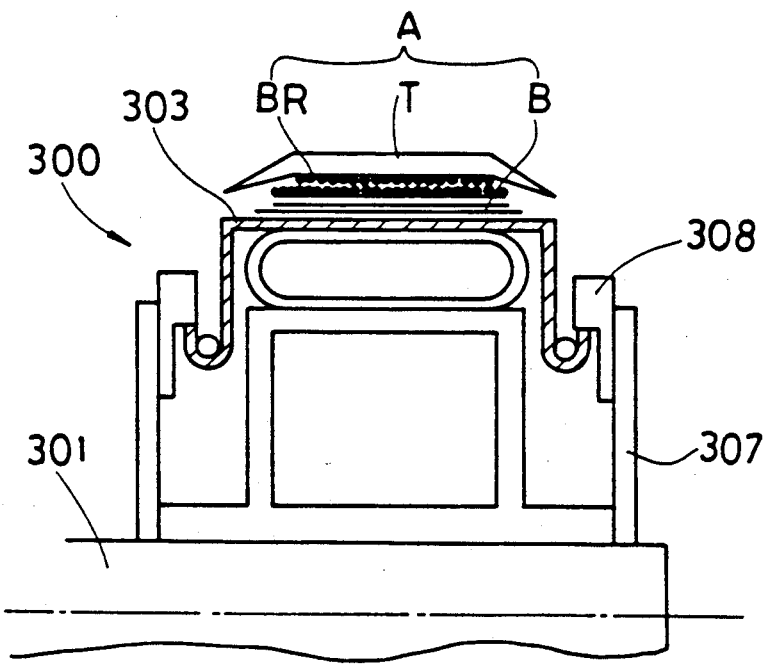
Figure 41:
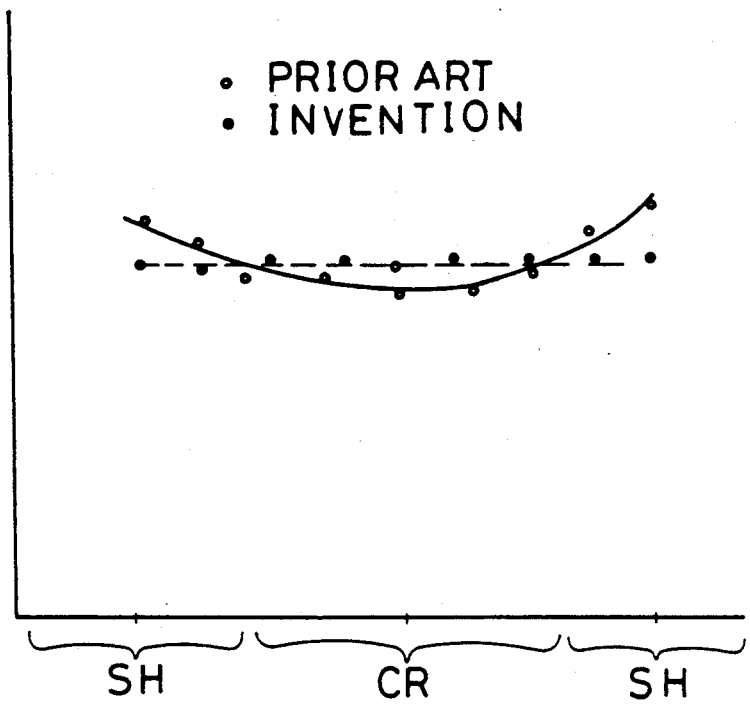
FIG. 41 is a view showing a distribution of residual elongation of a cord of a band.
Figure 42:
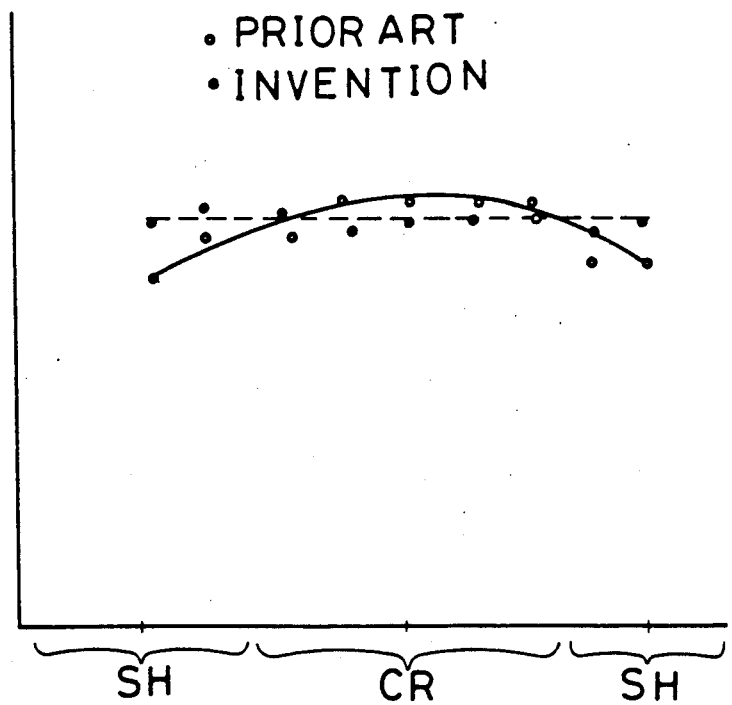
FIG. 42 is a view showing a distribution of thermal shrinking force of a cord of a band.
Figure 43:
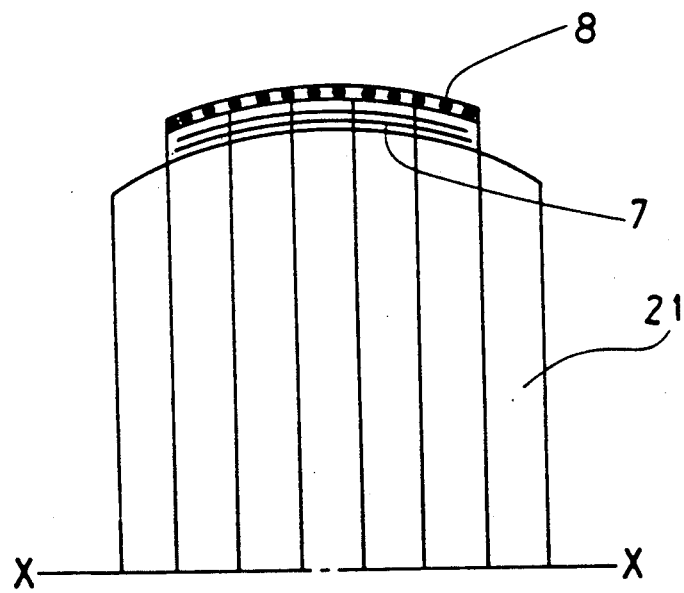
FIG. 43 is a view showing another assembly which can be formed by using the method for forming belt-band-tread rubber assemblies of this invention and the forming apparatus of this invention.

FIGS. 37 and 38 show other examples of the band forming device of this invention, in which the basic construction is nearly the same, but a pair of let-off means for drawing out the cord C are provided. As a result, two cords can be simultaneously and symmetrically wound from the center position toward each shoulder portion of the belt.

In other words, a pair of let-off means 73b, 73c are disposed side by side in the widthwise direction of the belt drum 21, and are slidably supported by rails 71e, 71f disposed parallel on the frame 70c. The let-off means 73b, 73c are respectively screwed to the screw shafts 71a, 71b arranged parallel to the rails and mutually in identical direction. THe screw shafts 71a, 71b are rotated in the reverse direction along with the rotation of the motor 71c by the gear, and therefore the pair of let-off means traverse in the mutually departing directions (arrow directions) from the center position, or, to the contrary, in the mutually opposite directins and at the same speed.

Besides, these let-off means 73b, 73c are furnished with upward projecting arms 77a, 77b, and each arm is equipped with plural guide pulleys 75. This arm, same as in the foregoing embodiments, is independently thrust by means of spring 85 toward the drum and slidably on the rail 71g, and this roll 78a abuts against the copying plate 79, and it may be possible to design so that each let-off means may be movable in the belt widthwise direction, while keeping a desired spacing to the belt drum surface.

On the frame 70c, furthermore, a tension detector (a differential transformer type) 80 is mounted.

When the cord C passes through the guide roll 80a and detection roll 80b of this tension detector 80, the tension is detected, and the deviation from the set value is fed back to the brake pulley 74, and the braking extent is adjusted. Numeral 74a is a press roll which is thrust to the brake pulley 74 side by the spring 84 through a link.

The guide pulley 75a is rotatably supported on the arm 81b of the L-shaped arms 81a, 81b. A proximity switch 82 is provided opposite to the arm 81a, and a spring 83 is fixed, so that the guide pulley 75a is thrust in the arrow direction, turning about the shaft 83a as the fulcrum. If an excess tension is applied on the cord due to some reason, the arm 81a actuates the proximity switch 82, and stops the feed of the cord.

Incidentally, the two screw shafts 71a, 71b may form threads in the mutually opposite directions, and these two shafts may be rotated in a same direction. Or, instead of a pair of screw shafts, a single screw shaft having right and left threads may be used. Or, instead of traversing by rotating the screw shaft by motor, other means such as cylinder may be used to traverse. Still more, the independent control unit is not needed if the power supply unit 92 and drive unit 93 are additionally furnished with arithmetic functions of the control unit 90.

Figure 33:
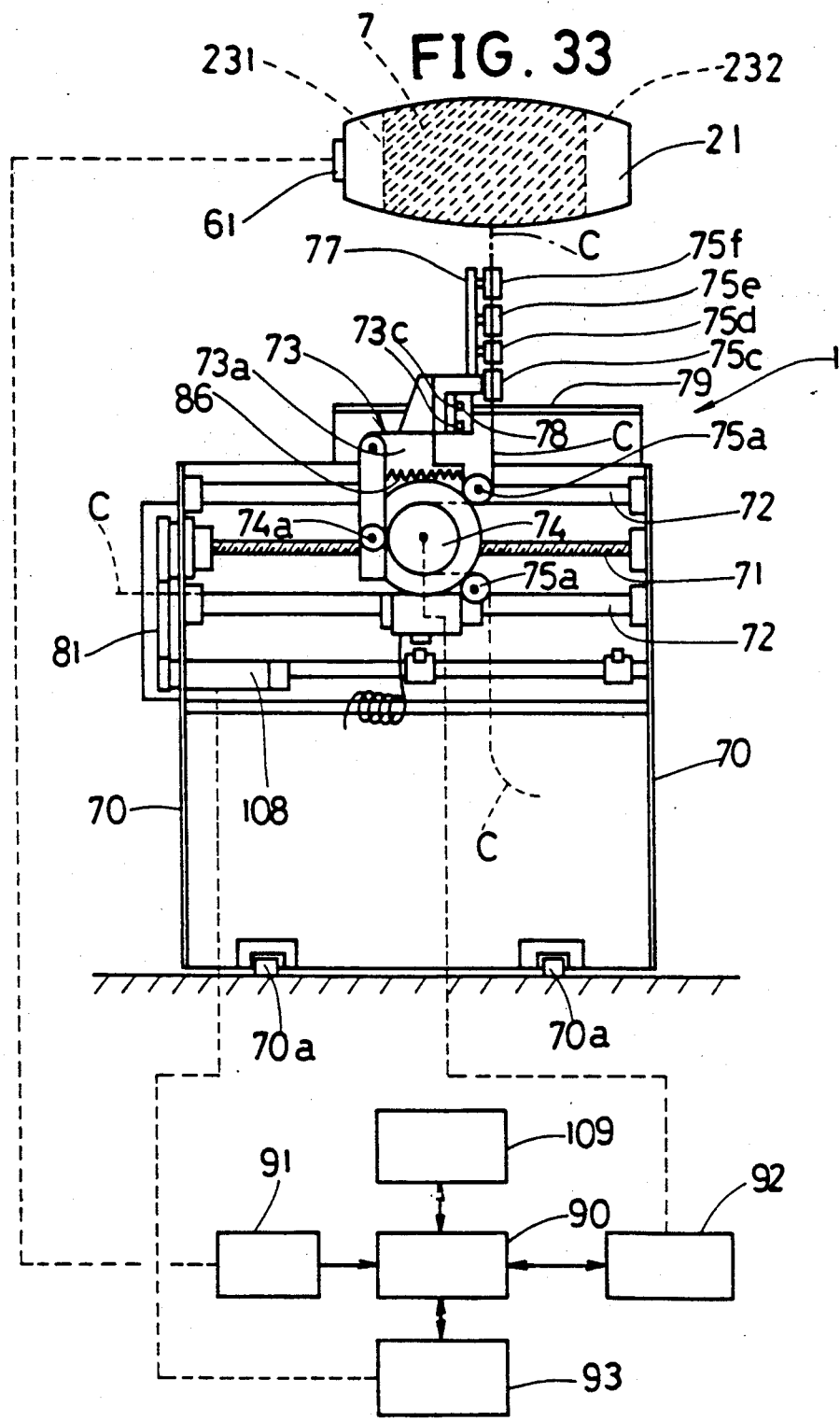
FIG. 33 is a front view showing an embodiment of the band forming apparatus of this invention.
Figure 34:
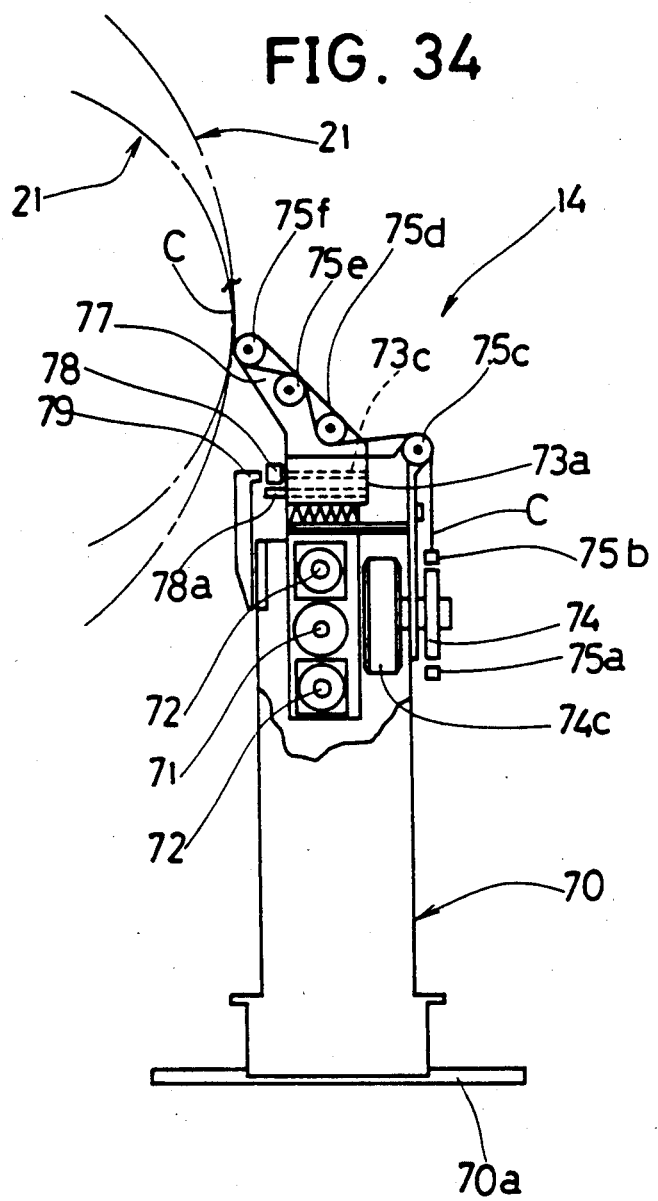
FIG. 34 is a side view thereof.

In the devices shown in FIGS. 33 to 35, a winding start position 231, winding end position 232, winding pitch, winding tension and other data are set in the setting board 109, and they are stored in the control unit 90. The winding start position and end position denote the positions in the widthwise direction of the belt drum, and mean, for example, the distance from the middle of the belt drum 21. In consequence, by the output from the drive unit 93, the servo motor 108 is driven, and the let-off means 73 traverses from the waiting position, and moves to the predetermined winding start position. Then the leading end of the cord is pressed manually by an operator to the start position of the belt to fit tightly. It is easy to mechanize this step by means of cylinder and link mechanism. Then when the automatic operation button is pressed, the belt drum begins to rotate, and the powder brake 74c is put in action by the output from the power supply unit 92, thus the cord is let out in the state of being loaded with a predetermined tension by the brake pulley 74. At the same time, against the belt drum rotating at constant speed, the let-off means is traversed toward the winding end position, and the cord is continuously and spirally wound at a predetermined pitch. The speed of traverse at that time is set so that the winding pitch may be synchronized with the signal from the encoder 61 of the belt drum, that is, the rotating speed of the belt drum.

The cord is wound on the belt 7, as shown in FIGS. 10 to 16, by the above-mentioned sending out of cord to the belt drum.

This winding operation is done in a so-called one-stroke scribbling process.

That is, using the devices shown in FIGS. 33 to 35, when winding is conducted to form a combined band of full band and edge bands as shown in FIG. 13, the cord should be wound so that its trace may be drawing in an S-form in the arrow direction as shown in FIG. 14. In that case, as a natural consequence, the portion of band formed in the initial stage of winding and the portion formed in the finishing stage becomes asymmetrical to each other.

Also, when winding shown in FIG. 13 is conducted by using the devices shown in FIGS. 37 and 38, two cords C1 and C2 are wound to draw traces in the arrow directions as shown in FIG. 15, whereby the cords C1, C2 are wound continuously and spirally at a predetermined pitch in mutually symmetrical structures. It is preferable to shift the winding start position (winding start end) and winding end position (winding finishing end) of cords C1, C2 mutually in the circumferential direction. The reason is that since the strength changes suddenly at cord end parts, it is necessary to disperse the influences of these end parts as widely as possible. Since the stress tends to be concentrated on the belt end parts, it is also preferable to position the end of each cord at the middle part of the belt as far as possible. Thus, by operating the pair of let-off means 73b, 73c simultaneously in the mutually reverse directions, the time required for winding the cord may be reduced to half of the time required for winding by a usual single winding means, so that the productivity may be doubled.

Moreover, particularly, when a tape-like material 11 composed of integrally formed several cords as shown in FIG. 7 is used, the winding efficency can be further enhanced.

As explained above, according to the method of this invention, upon forming an assembly of belt, band and tread rubber by using a belt drum, the band is formed into the same or similar shape as its final finished shape in the mold, in the sectional shape in the axial direction, namely a convex shape of which absolute value of the difference between the middle portion stretch and shoulder portion stretch of the band is within 2%. Consequently, the residual elongation and thermal shrinkage of the cord in the mold-finished tire is made approximately uniform between the middle portion and the shoulder portions, thus the lifting of the belt by centrifugal force in running is prevented and the high speed durability of radial tires can be enhanced.

Also, one to several organic fiber cords are continuously and spirally wound, parallel to the circumferential direction, on the outer surface of the belt, so that the winding tension may be uniform over the entire width of the belt, or be maximum at the shoulder portion, or the winding pitch may be dense at the belt shoulder portion. Consequently, the difference in stretch between the belt shoulder portion and belt middle portion of a vulcanized tire is reduced, and the thermal shrinking force of the belt shoulder portion is improved, so that the action to prevent lifting of the belt in traveling is potently exhibited, whereby separation damage of the belt due to lifting in traveling can be prevented more securely.

Besides, by using the device of this invention, the execution of the above method can be done more efficiently and precisely.

Further, according to this invention, since the belt drum is deformed in a convex shape after winding belt on the cylindrical belt drum, and thereon one tape-like material formed by covering one to several cords with a rubber is spirally wound to adhere it tightly on the entire width of the belt drum, the belt is prevented from unusual moving when winding the band, and hence the belt is free from deformation, crease or slack. Still more, in the method of this invention, since the belt is wound on a cylindrical belt drum, the belt can be wound in good alignment, without causing meandering, when winding. Furthermore, in the device and the method of this invention, since the belt drum is an annular body continuous in the circumferential direction, different from a conventional segment type in which the drum surface is formed by segments, it becomes possible to adhere the belt without steps, especially at both ends of the both sides in the circumferential direction, and therefore the corrugated application as experienced by the conventional type drum is avoided, and separation damage of the belt shoulder portion can be prevented.

INDUSTRIAL APPLICABILITY

This invention is applicable to radial tires having various structures, tread patterns and tire sizes, and in particular this invention is effectively applicable to flattened tires for high speed running.

We claim:

1. A method of forming an assembly of a belt, a band and a tread rubber for making a pneumatic tire, by using an expansive drum capable of changing the axial cross sectional shape thereof from a substantially flat shape to a convex shape, said method comprising the steps of:
   winding a plurality of belt plies made of an inorganic or organic fiber cord on the drum surface which is substantially flat so as to form a cylindrical belt in which the cord angle with respect to the circumferential direction thereof is from 10 to 40 degrees;

expanding the drum so as to make the drum cross sectional shape substantially an ultimate finishing cross sectional shape of the band in a vulcanizing mold;

forming a band comprised of at least one organic fiber cord oriented at an angle of 0 to 5 degrees with respect to the circumferential direction of the tire, on the radially outer side of said belt on the expanded drum;

winding a tread rubber on the radially outer side of said band; and making the assembled belt, band and tread rubber into one body.

2. The method as set forth in claim 1 wherein the axial cross sectional shape of said expanded drum is a convex shape such that when the formed band is changed into said ultimate finishing sectional shape in the mold, the resultant stretch of the band has a difference within the range of 0% to 2% between a center portion and shoulder portions thereof.

3. The method as set forth in claim 1 or 2 wherein said band forming step comprises a step of winding at least one organic fiber cord on the radially outer side of the belt on the expanded drum continuously and spirally at an angle of approximately 0 to 5 degrees with respect to the circumferential direction of the tire.

4. The method as set forth in claim 3 wherein said at least one organic fiber cord is wound over a center portion and edge portions of the belt, and the cord tension in the winding operation is substantially constant between the center portion and the edge portions of the belt.

5. The method as set forth in claim 3 wherein said at least one organic fiber cord is wound over a center portion and edge portions of the belt, and the cord tension in the winding operation is varied in the axial direction of the tire so that a minimum lies in the center of the belt and a maximum lies in each edge portion of the belt.

6. The method as set forth in claim 3 wherein the band cord pitch in edge regions of the belt is from 0.5 to 5.0 mm.

7. The method as set forth in claim 3 wherein said at least one organic fiber is coated with a rubber.

8. The method as set forth in claim 1 wherein said band forming step includes a step of winding a plurality of tape-like materials on the radially outer side of the belt on the expanded drum so that cords embedded therein are oriented at an angle of 0 to 5 degrees with respect to the circumferential direction of the drum, where said tape-like material is formed by:

coating an organic fiber cord fabric with a rubber;

cutting the rubber coated fabric to have a width enough to cover the entire width of the belt on the expanded drum and at least a length enough to cover the entire circumference of the belt on the expanded drum and also overlap the ends thereof each other when wound and further dividing the cut fabric in the widthwise direction thereof into plural pieces.

* * * * *